US012762061B2

(12) United States Patent
Kim et al.

(10) Patent No.: US 12,762,061 B2
(45) Date of Patent: Oct. 13, 2026

(54) STORAGE CONTROLLER HAVING IMPROVED OVERLAY OPERATION PERFORMANCE, STORAGE DEVICE INCLUDING THE SAME, AND METHOD OF OPERATING STORAGE DEVICE

(71) Applicant: SAMSUNG ELECTRONICS CO., LTD., Suwon-si (KR)

(72) Inventors: Yeonwoo Kim, Suwon-si (KR); Soojung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/819,398

(22) Filed: Aug. 29, 2024

(65) Prior Publication Data

US 2025/0147892 A1 May 8, 2025

(30) Foreign Application Priority Data

Nov. 8, 2023 (KR) ........................ 10-2023-0153672

(51) Int. Cl.
*G06F 12/0862* (2016.01)
*G06F 9/38* (2018.01)
*G06F 9/54* (2006.01)
*G06F 12/02* (2006.01)

(52) U.S. Cl.
CPC ........ *G06F 12/0862* (2013.01); *G06F 9/3802* (2013.01); *G06F 9/542* (2013.01); *G06F 12/0292* (2013.01)

(58) Field of Classification Search
None
See application file for complete search history.

(56) References Cited

U.S. PATENT DOCUMENTS 6,256,727 B1 7/2001 Mcdonald
9,715,402 B2 7/2017 Wagner et al.
10,387,319 B2 8/2019 Adler et al.
11,327,762 B2 5/2022 Tang et al.
11,360,893 B2 6/2022 Lee
2005/0204121 A1* 9/2005 Burdass ................ G06F 9/3861 712/E9.056

(Continued)

FOREIGN PATENT DOCUMENTS

JP 2000-122880 A 4/2000
KR 20080073822 A * 8/2008 ......... G06F 12/0862

OTHER PUBLICATIONS

Translation of KR-20080073822-A. 2025.*

(Continued)

*Primary Examiner* — Nathan Sadler
(74) *Attorney, Agent, or Firm* — Sughrue Mion, PLLC

(57) ABSTRACT

A storage controller, a storage device, and a method of operating the storage device are provided. The storage controller includes a working memory; a processor configured to, in response to an occurrence of an event, execute a first code block and a second code block related to the event, that are loaded into the working memory; a first mapping table that includes first mapping information between the first and second code blocks and the event; and a prefetching memory configured to provide the first code block and the second code block, prefetched based on the first mapping information, to the working memory in a predetermined order.

20 Claims, 20 Drawing Sheets

(56) References Cited

U.S. PATENT DOCUMENTS

| | | | | |
|---|---|---|---|---|
| 2010/0036987 | A1* | 2/2010 | Streett | G06F 9/3802 712/E9.016 |
| 2015/0242202 | A1* | 8/2015 | Jun | G06F 3/0661 717/168 |
| 2016/0092250 | A1 | 3/2016 | Wagner et al. | |
| 2018/0011735 | A1* | 1/2018 | Singer | G06F 9/46 |
| 2019/0004955 | A1 | 1/2019 | Adler et al. | |
| 2020/0084274 | A1 | 3/2020 | Moorthi et al. | |
| 2021/0026633 | A1* | 1/2021 | Lee | G06F 12/124 |
| 2021/0056026 | A1 | 2/2021 | Lee | |
| 2021/0173653 | A1 | 6/2021 | Tang et al. | |
| 2023/0205434 | A1* | 6/2023 | Chen | G06F 3/0634 711/156 |

OTHER PUBLICATIONS

Batcher et al. "Interrupt Triggered Software Prefetching for Embedded CPU Instruction Cache." Apr. 2006. IEEE. RTAS'06.*
Digital Computer Basics. 1983. United States Government Printing Office. pp. 122-135.*
Kallurkar et al. "pTask: A Smart Prefetching Scheme for OS Intensive Applications." Oct. 2016. IEEE. Micro 2016.*

* cited by examiner

FIG. 4

214_3

| | INDEX | EV | REGION(Addr_D) |
|---|---|---|---|
| MP0 | 0 | EV0(COMMIT_REQ) | RG4, RG5, RG8, RG9 |
| MP1 | 1 | EV1(ID_REQ) | RG1, RG2, RGn-1 |
| MP2 | 2 | EV2(ENTER_PM) | RG1, RG3, RG5 |
| ⋮ | ⋮ | ⋮ | ⋮ |
| MPm | m | EVm(PCIe_RESET) | RG0, RG6, RG8, RG13, RGn |

FIG. 5

214_4

| | INDEX | EV | Caching ON/OFF |
|---|---|---|---|
| MCa0 | 0 | EV0(COMMIT_REQ) | ON |
| MCa1 | 1 | EV1(ID_REQ) | OFF |
| MCa2 | 2 | EV2(ENTER_PM) | ON |
| ⋮ | ⋮ | ⋮ | ⋮ |
| MCam | m | EVm(PCIe_RESET) | ON |

220

EV0(COMMIT_REQ) : CB4→CB0→CB3→CB5→CB1→CB0→CB3→CB8→CB0→CB3→CB9

EV2(ENTER_PM) : CB1→CB2→CB4→CB3→CB2→CB4→CB5

STORAGE CONTROLLER HAVING IMPROVED OVERLAY OPERATION PERFORMANCE, STORAGE DEVICE INCLUDING THE SAME, AND METHOD OF OPERATING STORAGE DEVICE

CROSS-REFERENCE TO RELATED APPLICATION

This application claims priority to and the benefit of Korean Patent Application No. 10-2023-0153672 filed in the Korean Intellectual Property Office on Nov. 8, 2023, the entire contents of which are incorporated herein by reference.

BACKGROUND

1. Field

Example embodiments of the disclosure relate to a storage controller, a storage device including the storage controller, and a method of operating the storage device.

2. Description of the Related Art

In embedded systems that do not support operating systems (hereinafter, referred to as OSs), programs larger than working memories are often executed by dividing the programs into code blocks called overlays.

Particularly, storage controllers with limited memory resources may execute firmware programs in an overlay manner. When a program is executed in an overlay manner, in a predetermined order, at execution times of code blocks, execution code blocks may be loaded from a non-volatile memory device into a memory in a storage controller by swapping and code blocks that are not required to be executed may be stored in a non-volatile memory device.

When a firmware program is performed in the overlay manner, an overhead occurs because each time a code block is executed, it is required to read the execution code block from a non-volatile memory device.

SUMMARY

One or more example embodiments of the disclosure provide a storage controller that may have an improved speed and efficiency of process processing.

Also, one or more example embodiments of the disclosure provide a storage controller that may have an improved overlay operation performance.

Further, one or more example embodiments of the disclosure provide a storage controller that may efficiently use less memory space to execute firmware programs.

According to an aspect of an example embodiment of the disclosure, provided is a storage controller including: a working memory; a processor configured to, in response to an occurrence of an event, execute a first code block and a second code block related to the event, that are loaded into the working memory; a first mapping table that includes first mapping information between the first and second code blocks and the event; and a prefetching memory configured to provide the first code block and the second code block, prefetched based on the first mapping information, to the working memory in a predetermined order.

According to an aspect of an example embodiment of the disclosure, provided is a storage device including: a non-volatile memory device configured to store a first code block and a second code block; and a storage controller including: a mapping table that includes first mapping information between a first event and the first and second code blocks, the mapping table further including a first address data corresponding to the first code block and a second address data corresponding to the second code block; a prefetching memory into which the first and second code blocks received from the non-volatile memory device are prefetched; and a working memory into which the prefetched first and second code blocks are loaded in a predetermined order.

According to an aspect of an example embodiment of the disclosure, provided is a method of operating a storage device, the method including: generating a trigger information related to an event, in response to an occurrence of the event; searching for first address data of a first code block and second address data of a second code block, based on the trigger information, the first and second code blocks being related to the event; transmitting a read command to a non-volatile memory device based on the first address data and the second address data; prefetching the first code block and the second code block received from the non-volatile memory device; and loading the first code block and the second code block into a working memory in a predetermined order.

According to an aspect of an example embodiment of the disclosure, provided is a storage controller including: a working memory; a processor configured to, in response to an occurrence of an event, execute a first code block related to the event, that is loaded into the working memory; a mapping table including mapping information between the event and whether a caching operation on the first code block is to be activated; and a caching memory into which the first code block loaded in the working memory is cached based on the mapping information.

BRIEF DESCRIPTION OF DRAWINGS

The above and other aspects, features, and advantages of certain example embodiments of the disclosure will be more apparent from the following description taken in conjunction with the accompanying drawings.

FIG. 4 is a drawing for explaining a prefetching mapping table of FIG. 3 according to an example embodiment.

FIG. 5 is a drawing for explaining a caching mapping table of FIG. 3 according to an example embodiment.

DETAILED DESCRIPTION

Figure 1:
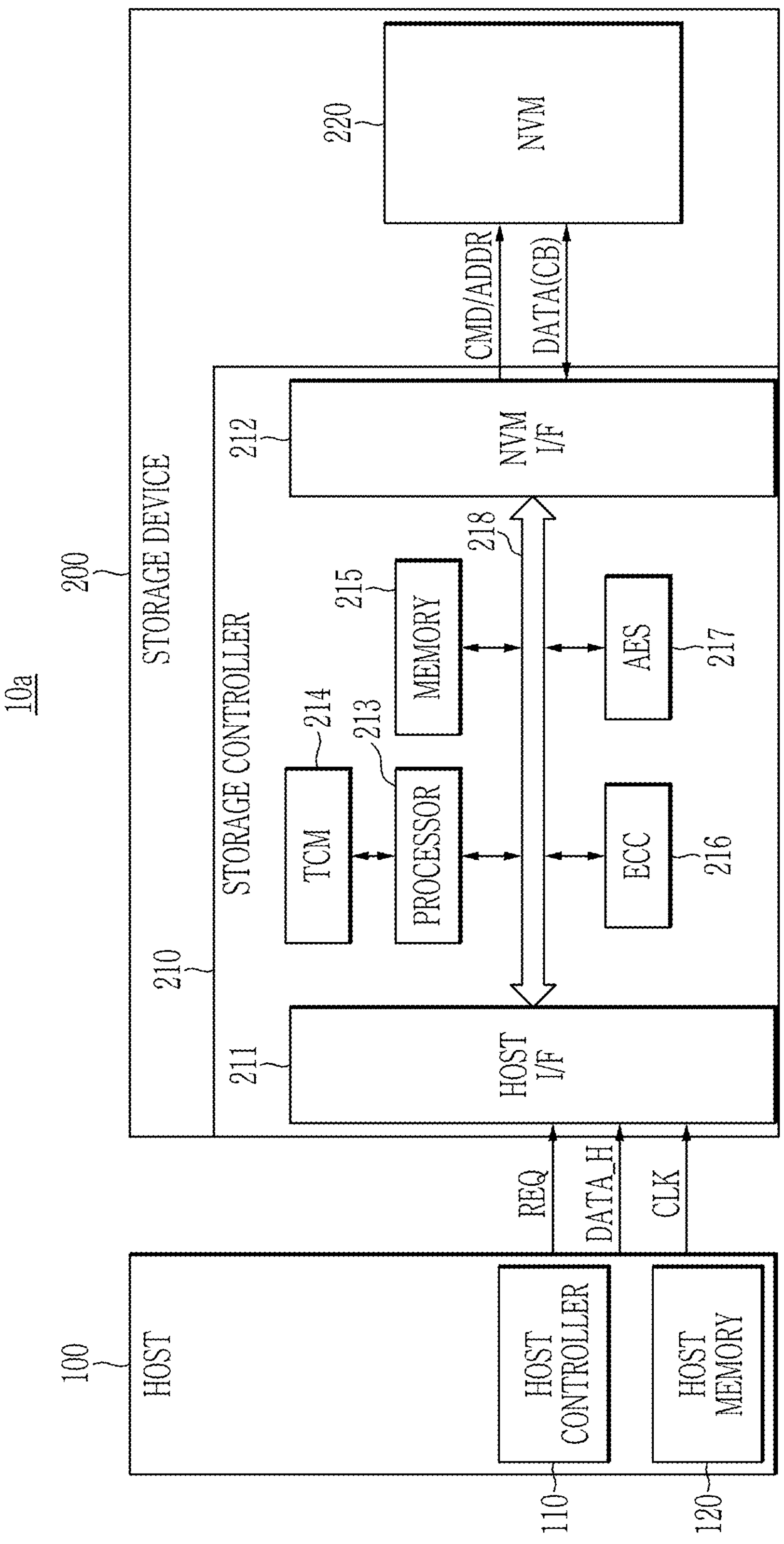
FIG. 1 is a block diagram illustrating a storage system according to an example embodiment.

In the following detailed description, only certain embodiments of the disclosure have been shown and described, simply by way of illustration. The disclosure can be variously implemented and is not limited to the following embodiments.

The drawings and description are to be regarded as illustrative in nature and not restrictive. Like reference numerals designate like elements throughout the specification.

In addition, the size and thickness of each configuration shown in the drawings are arbitrarily shown for understanding and ease of description, but the disclosure is not limited thereto. In the drawings, the thickness of layers, films, panels, regions, etc., are exaggerated for clarity. Further, in the drawings, for understanding and ease of description, the thickness of some layers and areas is exaggerated.

In addition, unless explicitly described to the contrary, the word "comprise", and variations such as "comprises" or "comprising", will be understood to imply the inclusion of stated elements but not the exclusion of any other elements.

Figure 2:
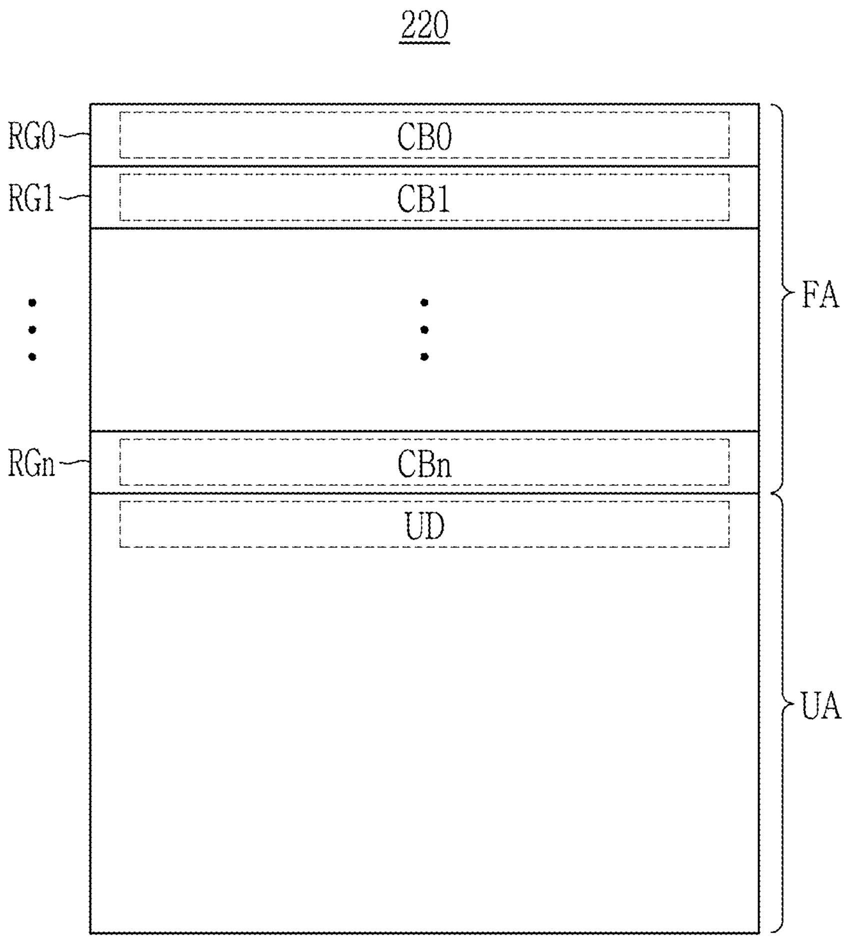
FIG. 2 is a drawing for explaining a non-volatile memory device according to an example embodiment.

FIG. 1 is a block diagram illustrating a storage system according to an example embodiment. FIG. 2 is a drawing for explaining a non-volatile memory device according to an example embodiment.

Referring to FIG. 1 and FIG. 2, a storage system 10*a* may include a host device 100 and a storage device 200.

The host device 100 may include a host controller 110 and a host memory 120.

According to an embodiment, the host controller 110 and the host memory 120 may be implemented as separate semiconductor chips. Alternatively, according to an embodiment, the host controller 110 and the host memory 120 may be integrated into the same semiconductor chip.

As an example, the host controller 110 may be one of a plurality of modules included in an application processor, and the application processor may be implemented as a system on chip (SoC). The host memory 120 may be an embedded memory that is included in an application processor, or a non-volatile memory or a memory module that is disposed outside an application processor.

The host controller 110 may manage an operation of storing data of a buffer memory (for example, write data) into a non-volatile memory device 220 or an operation of storing data of the non-volatile memory device 220 (for example, read data) into the buffer memory. Also, the host controller 110 may control the host device 100 such that the host device 100 provides requests REQ, related to operations of a storage device 200, to the storage device 200. The requests REQ may include a data write request, a data read request, a firmware program modification request, a device information read request, an interface state reset request, and the like.

The host memory 120 may serve as a buffer memory for temporarily storing data to be transmitted to the storage device 200 or data transmitted from the storage device 200.

The storage device 200 may include a storage controller 210 and the non-volatile memory device (NVM) 220.

The storage device 200 may include storage media for storing data DATA_H according to a request REQ that is provided from the host device 100. Also, the storage device 200 according to an embodiment may receive a reference clock signal CLK from the host device 100. For example, the storage device 200 may generate internal collected data by counting the reference clock signal CLK, and the storage controller 210 may execute a firmware program, such as a power management mode for executing low-power operations, based on the internal collected data.

Further, the storage device 200 according to an embodiment may be an embedded system that does not support any operating system (OS). The storage controller 210 may execute firmware programs in an overlay manner that replaces or overwrites code blocks or data loaded in a memory with other code blocks or data in a predetermined order.

The storage device 200 according to an embodiment may include at least one storage medium of solid state drives (SSDs), embedded memories, and detachable external memories.

When the storage device 200 is an SSD, for example, the storage device 200 may be a device that conforms to a non-volatile memory express (NVMe) standard. When the storage device 200 is an embedded memory or an external memory, the storage device 200 may be a device that conforms to a universal flash storage (UFS) or embedded multi-media card (eMMC) standard. Each of the host device 100 and the storage device 200 may generate packets according to an adopted standard protocol and transmit the generated packets.

The storage controller 210 may include a host interface 211 and a memory interface 212. Further, the storage controller 210 may include a processor 213, a tightly coupled memory (TCM) 214, a memory 215, an error correction code (ECC) engine 216, an advanced encryption standards (AES) engine 217, and so on, and the processor 213, the memory 215, the ECC engine 216, the AES engine 217, and so on may perform communication with one another through a bus 218. The storage controller 210 may control the overall operation of each component of the storage device 200. The storage controller 210 may execute a firmware program in response to a request REQ that is provided from the host device 100 or an event that occurs based on internal collected data.

The host interface 211 may transmit and receive packets to and from the host device 100. Packets that are transmitted from the host device 100 to the host interface 211 may contain requests REQ or data DATA_H to be written in the non-volatile memory device 220, and the like, and packets that are transmitted from the host interface 211 to the host device 100 may contain responses to requests or data DATA read from the non-volatile memory device 220, and the like.

The memory interface 212 may provide data to be written in the non-volatile memory device 220, to the non-volatile memory device 220, or may provide data read from the non-volatile memory device 220. The memory interface 212 may be configured to comply with a standard protocol such as Toggle or Open NAND Flash Interface (ONFI).

The processor 213 may control the overall operation of each component of the storage controller 210. The processor 213 may execute firmware programs installed in the storage device 200, and may serve to provide commands CMD to the non-volatile memory device 220. The non-volatile memory device 220 may perform operations of writing and reading data DATA in response to the provided commands CMD.

In some embodiments, the processor 213 may be various processing units such as a central processing unit (CPU), an application processor (AP), a graphic processing unit (GPU), or the like, or may be implemented in the form of a combination thereof.

The TCM 214 may be included in the processor 213, or may be a tightly coupled memory (TCM) that is coupled to the processor 213 without the bus 218 in the storage controller 210 between the TCM 214 and the processor 213. In some embodiments, the TCM 214 may include a static RAM (hereinafter, referred to as SRAM), registers, and the like.

In some embodiments, modules for managing operations of loading into memories, prefetching operations, and caching operations on code blocks CB contained in firmware programs may be included in the storage controller 210, and in some embodiments, the modules may be loaded into the TCM 214. The modules may be implemented with software; however, in some embodiments, the modules may be implemented with hardware. A detailed description of the modules will be made later with reference to FIG. 3.

The memory 215 according to an embodiment may be a working memory of the storage controller 210, and the codes of a program to be executed in the processor 213 may be loaded into the memory 215. In some embodiments, in response to the occurrence of an event, code blocks of a program may be loaded into the memory 215 in a predetermined order in an overlay manner.

Although not shown in the drawings, the memory 215 may serve as a working memory, and a flash translation layer (FTL), a packet manager, and the like may be loaded into the memory 215. The processor 213 may execute the loaded flash translation layer, and based thereon, data write and read operations on the non-volatile memory device 220 may be controlled. The flash translation layer may perform various functions such as, for example, address mapping, wear-leveling, and garbage collection. The address mapping operation is an operation of translating a logical address provided from the host device 100 into a physical address to be actually used to store data in the non-volatile memory device 220.

The processor 213 may execute the packet manager loaded in the memory 215, and based thereon, packets according to the protocol of an interface consented by the host device 100 may be generated, or a variety of information may be parsed from packets received from the host device 100.

Further, the memory 215 according to an embodiment may serve as a prefetching memory, such that code blocks of a program to be executed may be prefetched by the memory 215 from the non-volatile memory device 220 into the working memory. The prefetched code blocks may be copied and the copies may be provided to the working memory. Furthermore, the memory 215 according to an embodiment may serve as a caching memory into which copies of code blocks executed in the working memory may be cached. Thereafter, the cached code blocks may be copied, and the copies may be provided to the working memory.

Also, the memory 215 according to an embodiment may serve as a buffer memory for temporarily storing, for example, data DATA, commands CMD, and addresses ADDR to be transmitted from the host device 100 to the storage device 200, or data DATA received from the storage device 200.

According to an embodiment, the storage device 200 may be a dynamic RAM (hereinafter, referred to as DRAM)-less device in which any DRAM is not disposed, and accordingly, the memory 215 may include a SRAM, registers, and the like. A detailed description of the memory 215 will be made later with reference to FIG. 6.

The ECC engine 216 may perform an error detection and correction function on read data that are read from the non-volatile memory device 220. Also, the ECC engine 216 may generate parity bits for write data to be written in the non-volatile memory device 220, and the generated parity bits may be stored in the non-volatile memory device 220 along with the write data. When data is read from the non-volatile memory device 220, the ECC engine 216 may correct errors in the read data, using parity bits read together with the read data from the non-volatile memory device 220, and output the read data subjected to the error correction.

The AES engine 217 may perform at least one of an encryption operation and a decryption operation on data that are input to the storage controller 210. In some embodiments, the AES engine 217 may perform an encryption or decryption operation using a symmetric-key algorithm. Alternatively, in some embodiments, the AES engine 217 may perform an asymmetric encryption operation using an asymmetric-key algorithm.

According to an embodiment, the non-volatile memory device 220 may include a flash memory, and the flash memory may include a two-dimensional (2D) NAND memory cell array or a three-dimensional (3D) (or vertical) NAND (VNAND) memory cell array. As another embodiment, the storage device 200 may include various other types of non-volatile memory devices. For ease of explanation, the storage device 200 may include a magnetic RAM (MRAM), a spin-transfer torque MRAM, a conductive bridging RAM (CBRAM), a ferroelectric RAM (FeRAM), a phase RAM (PRAM), a resistive RAM, and various other types of memory.

Referring to FIG. 2 together, the non-volatile memory device 220 may include a firmware area FA where the code blocks CB of a firmware program are stored, and a user data area UA where user data UD are stored.

The code blocks CB may include 0-th to n-th code block CB0 to CBn (wherein n is an integer equal to or greater than 2). The 0-th to n-th code blocks CB0 to CBn may be stored in first to n-th regions RG1 to RGn of the firmware area FA, respectively. In some embodiments, the first to n-th regions RG1 to RGn may correspond to physical pages of the non-volatile memory device 220, and may have a size of 4 KB. However, the size of the first to n-th regions RG1 to RGn is merely an example, and the disclosure is not limited thereto. In some embodiments, a physical address corresponding to a physical page may be assigned to each of the first to n-th regions RG1 to RGn.

In some embodiments, the 0-th to n-th code blocks CB0 to CBn may contain metadata. As an example, each of the 0-th to n-th code blocks CB0 to CBn may contain address data (for example, physical addresses) for the 0-th to n-th code blocks CB0 to CBn.

In some embodiments, the 0-th to n-th code blocks CB0 to CBn may be stored in an object code form in the first to n-th regions RG1 to RGn, respectively. Further, each of the 0-th to n-th code blocks CB0 to CBn may correspond to a set of functions that are executed or data that are processed in the firmware program. The functions may include math functions, character string processing functions, function calls, user-defined functions, and the like, but are not limited to the function examples. The data may include local variables, global variables, setting data, hash data, and the like, but are not limited to the data examples.

In the user data area UA, data DATA_H provided from the host device 100 may be stored in the form of user data UD. In some embodiments, the user data UD may be encrypted by the AES engine 217 and be stored.

Figure 3:
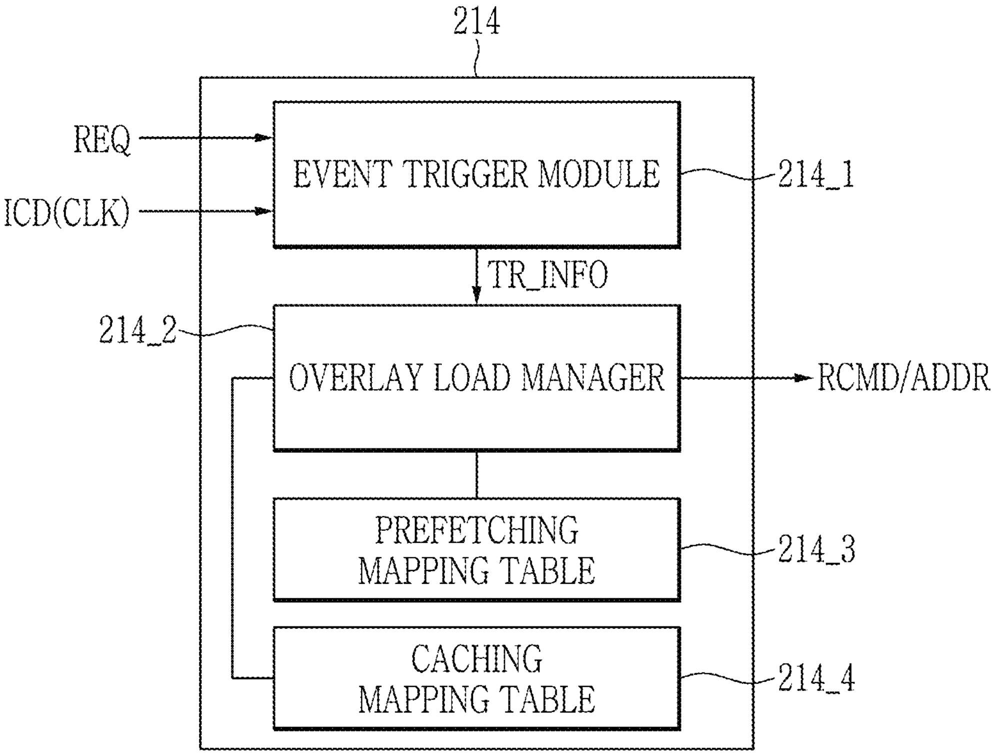
FIG. 3 is a block diagram for explaining a tightly coupled memory (TCM) in a storage controller according to an example embodiment.

FIG. 3 is a block diagram for explaining a TCM in a storage controller according to an example embodiment. FIG. 4 is a drawing for explaining a prefetching mapping table of FIG. 3 according to an example embodiment. FIG. 5 is a drawing for explaining a caching mapping table of FIG. 3 according to an example embodiment.

Referring to FIG. 1 to FIG. 5, the storage controller 210 may include an event trigger module 214_1, an overlay load manager 214_2, a prefetching mapping table 2143, and a caching mapping table 214_4. According to an embodiment, the event trigger module 214_1, the overlay load manager 214_2, the prefetching mapping table 214_3, and the caching mapping table 214_4 may be loaded into the TCM 214.

The event trigger module 214_1 may output trigger information TR_INFO depending on an occurrence of an event EV. The event EV may include receiving a firmware program modification request, receiving a device information read request, receiving an interface state reset request, entering a power management mode for a low-power operation of the storage device 200, and the like, but are not limited thereto.

The event EV may occur based on reception of a request REQ from the host device 100 or internal collected data ICD of the storage device 200. The internal collected data ICD may include an internal context change in the firmware program, the count of the reference clock signal CLK, and the like, but are not limited thereto. According to an embodiment, the event trigger module 214_1 may receive requests REQ or internal collected data ICD from the host device 100.

Trigger information TR_INFO may correspond to an individual event EV, and according to an embodiment, the trigger information TR_INFO may correspond to an index value of the prefetching mapping table 214_3 and an index value of the caching mapping table 214_4.

The overlay load manager 214_2 may receive trigger information TR_INFO from the event trigger module 214_1, and retrieve address data Addr_D related to code blocks CB, which are objects of a prefetching operation corresponding to the event EV, based on the trigger information TR_INFO and the prefetching mapping table 214_3.

The prefetching mapping table 214_3 may contain prefetching mapping information MP0 to MPm (m being an integer equal to or greater than 3), respectively corresponding to index values, wherein each of the index values corresponds to individual trigger information TR_INFO. The prefetching mapping information MP0 to MPm may correspond to 0-th to m-th events EV0 to EVm (m being an integer equal to or greater than 3), respectively, and each prefetching mapping information contains address data Addr_D corresponding to a corresponding one of the 0-th to m-th events EV0 to EVm.

The overlay load manager 214_2 may retrieve address data Addr_D based on trigger information TR_INFO and corresponding prefetching mapping information, among the prefetching mapping information MP0 to MPm. A value of 'm' in this embodiment is merely an example, and the number of prefetching mapping information is not limited thereto.

Referring to FIG. 4 as an example, when the 0-th event EV0 which is receiving a firmware program modification request occurs, the overlay load manager 214_2 may receive an index value of 0 as trigger information TR_INFO. The overlay load manager 214_2 may retrieve the fourth region RG4, the fifth region RG5, the eighth region RG8, and the ninth region RG9 corresponding to address data Addr_D which is included in the 0-th prefetching mapping information MP0 that corresponds to the index value of 0.

Also, when the first event EV1 corresponding to receiving a device information read request occurs, the overlay load manager 214_2 may receive an index value of 1 as trigger information TR_INFO. The overlay load manager 214_2 may retrieve the first region RG1, the second region RG2, and the (n−1)-th region RGn−1 corresponding to address data Addr_D, which is included in the first prefetching mapping information MP1 that corresponds to the index value of 1.

Further, when the second event EV2 corresponding to entering the power management mode occurs, the overlay load manager 214_2 may receive an index value of 2 as trigger information TR_INFO. The overlay load manager 214_2 may retrieve the first region RG1, the third region RG3, and the fifth region RG5 corresponding to address data Addr_D, which is included in the second prefetching mapping information MP2 that corresponds to the index value of 2.

Furthermore, when the m-th event EVm corresponding to receiving a PCIe interface state reset request occurs, the overlay load manager 214_2 may receive an index value of m as trigger information TR_INFO. The overlay load manager 2142 may retrieve the 0-th region RG0, the sixth region RG6, the eighth region RG8, the thirteenth region RG13, and the n-th region RGn corresponding to address data Addr_D, included in the m-th prefetching mapping information MPm that corresponds to the index value of m. The correspondence between the events and the mapping information shown in FIG. 4 is an example for facilitating explanation, and embodiments of the disclosure are not limited to the above example.

Each of the 0-th to m-th prefetching mapping information MP0 to MPm according to an embodiment may contain one-to-many information in which a plurality of regions correspond to one event. Accordingly, in some embodiments, a plurality of code blocks may correspond to one event.

Also, in some embodiments, one region may be shared by a plurality of events. Referring to FIG. 4 as an example, the first region RG1 may be shared by the first event EV1 and the second event EV2.

The overlay load manager 214_2 may provide a read command RCMD and addresses ADDR to the non-volatile memory device 220, based on the retrieved address data Addr_D. The overlay load manager 214_2 may perform a prefetching operation on code blocks CB provided from the non-volatile memory device 220 in response to the read command RCMD.

Further, the overlay load manager 2142 may check whether code blocks CB to be executed have been prefetched. In some embodiments, the overlay load manager 214_2 may check whether code blocks CB to be executed have been prefetched, by checking the metadata (for example, physical addresses) of prefetched code blocks CB_PF, but is not limited thereto.

When a code block CB to be executed has been prefetched, the overlay load manager 214_2 may copy the prefetched code block CB and load the copy into a working memory 215_WM of FIG. 6 (which will be described later), without providing a read command RCMD to the non-volatile memory device 220. When a code block CB to be executed has not been prefetched, the overlay load manager 2142 may provide a read command RCMD to the non-volatile memory device 220, thereby loading the code block CB to be executed into the working memory 215_WM.

The overlay load manager 214_2 may receive trigger information TR_INFO from the event trigger module 214_1, and check whether a caching operation on the code blocks of an event EV is to be activated, based on the trigger information TR_INFO and the caching mapping table 214_4.

Referring to FIG. 5, the caching mapping table 214_4 may contain caching mapping information MCa0 to MCam (m being an integer equal to or greater than 3), respectively corresponding to index values, wherein each of the index values corresponds to individual trigger information TR_INFO. The caching mapping information MCa0 to MCam may correspond to the 0-th to m-th events EV0 to EVm (m being an integer equal to or greater than 3), respectively, and each caching mapping information contains information on whether a caching operation on code blocks CB of a corresponding one of the 0-th to m-th events EV0 to EVm is to be activated.

For example, the 0-th caching mapping information MCa0 may correspond to an index value of 0, correspond to the 0-th event EV0, and contain information indicating that a caching operation on execution code blocks of the 0-th event EV0 is to be activated. The first caching mapping information MCa1 may correspond to an index value of 1, correspond to the first event EV1, and contain information indicating that a caching operation on execution code blocks of the first event EV1 is to be not activated. The second caching mapping information MCa2 may correspond to an index value of 2, correspond to the second event EV2, and contain information indicating that a caching operation on execution code blocks of the second event EV2 is to be activated. The m-th caching mapping information MCam may correspond to an index value of m, correspond to the m-th event EVm, and contain information indicating that a caching operation on execution code blocks of the m-th event EVm is to be activated.

Based on the trigger information TR_INFO and the caching mapping information MCa0 to MCam, the overlay load manager 2142 may execute the code blocks CB related to the 0-th to m-th events EV0 to EVm, and then determine whether a caching operation on execution code blocks is to be activated. According to an embodiment, the overlay load manager 2142 may perform a caching operation on execution code blocks different from prefetched code blocks, depending on whether a caching operation is to be activated.

Referring to FIG. 2, FIG. 4, and FIG. 5 as an example, the overlay load manager 2142 may execute code blocks related to the 0-th event EV0, and perform a caching operation on the executed code blocks that are different from the fourth code block CB4, the fifth code block CB5, the eighth code block CB8, and the ninth code block CB9, which are prefetched code blocks related to the 0-th event EV0.

The overlay load manager 214_2 may not perform a caching operation on execution code blocks with respect to the first event EV1.

Further, the overlay load manager 214_2 may execute code blocks related to the second event EV2, and perform a caching operation on the executed code blocks that are different from the first code block CB1, the third code block CB3, and the fifth code block CB5, which are prefetched code blocks related to the second event EV2.

Further, the overlay load manager 214_2 may execute code blocks related to the m-th event EVm, and perform a caching operation on the executed code blocks that are different from the 0-th code block CB0, the sixth code block CB6, the eighth code block CB8, the thirteenth code block CB13, and the n-th code block CBn, which are prefetched code blocks related to the m-th event EVm.

In addition, the overlay load manager 214_2 may check whether code blocks CB to be executed have been cached. According to an embodiment, the overlay load manager 214_2 may check whether code blocks CB to be executed have been cached by checking the metadata (for example, physical addresses) of cached code blocks CB_Ca; however, the overlay load manager 214_2 is not limited thereto.

Figure 6:
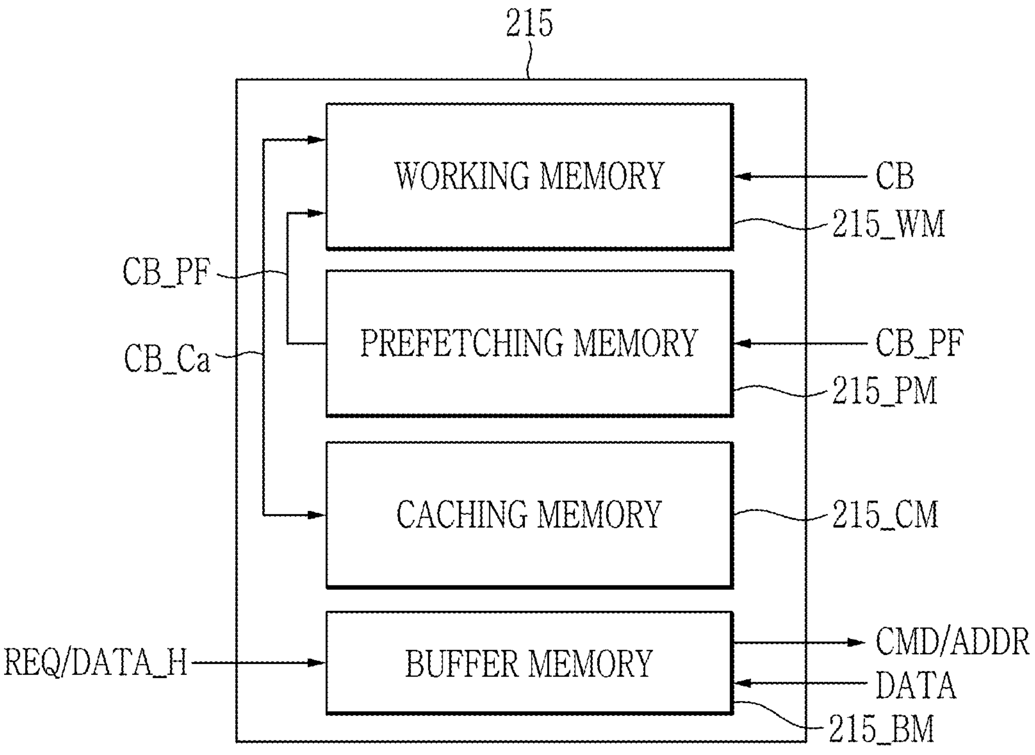
FIG. 6 is a drawing for explaining a memory in a storage controller according to an example embodiment.

When code blocks CB to be executed have been already cached, the overlay load manager 214_2 may copy the cached code blocks CB and load the copies into the working memory 215_WM of FIG. 6, without providing a read command RCMD to the non-volatile memory device 220. When code blocks CB to be executed have not been cached, the overlay load manager 2142 may provide a read command RCMD to the non-volatile memory device 220, thereby loading the code block CB to be executed into the working memory 215_WM.

The overlay load manager 214_2 may execute a firmware program in response to an occurrence of an event EV, and complete execution of the process related to the firmware program, and clear code blocks CB prefetched or cached in the memory 215.

The overlay load manager 214_2 may control loading, a prefetching operation, a caching operation, and the like of code blocks CB, that may be performed in response to an occurrence of an event EV.

In FIG. 3 to FIG. 5, the prefetching mapping table 214_3 and the caching mapping table 214_4 are shown as separate components; however, in some embodiments, the prefetching mapping table 214_3 and the caching mapping table 214_4 may be stored in a form of one mapping table. The one mapping table may contain address data and information indicating whether a caching operation is to be activated, corresponding to one event.

FIG. 6 is a drawing for explaining a memory of a storage controller according to an example embodiment.

Referring to FIG. 1 to FIG. 6, the memory 215 may include the working memory 215_WM, a prefetching memory 215_PM, a caching memory 215_CM, and a buffer memory 215_BM.

According to an embodiment, the working memory 215_WM, the prefetching memory 215_PM, the caching memory 215_CM, and the buffer memory 215_BM may be defined as separate areas in the memory 215, and may perform different functions. In some embodiments, the above-mentioned components in the memory 215 may be variously arranged in the memory 215.

Into the working memory 215_WM, code blocks CB of a firmware program to be executed in the storage controller 210 may be loaded. The processor 213 may execute the firmware program by executing the code blocks CB loaded in the working memory 215_WM.

According to an embodiment, only code blocks to be executed in the firmware program may be loaded into the working memory 215_WM in an overlay manner such that code blocks that have been executed may be overwritten with the code blocks to be executed, and then may be executed. According to an embodiment, only one code block may be loaded into the working memory 215_WM; however, the number of code blocks that are loaded into the working memory 215_WM is merely an example, and does not limit the embodiments of the disclosure.

The firmware program is a program that is executed in the storage device 200, and may include, for example, a flash translation layer (FTL) that performs a translation operation between logical addresses that the host device 100 requests from the storage device 200 and physical addresses of the non-volatile memory device 220, a packet manager, and so on.

The working memory 215_WM may receive code blocks CB from the non-volatile memory device 220, or may receive copies of prefetched code blocks CB_PF from the prefetching memory 215_PM, or may receive copies of cached code blocks CB_Ca from the caching memory 215_CM. The code blocks CB, the prefetched code blocks CB_PF, and the cached code blocks CB_Ca received may be loaded into the working memory 215_WM.

According to an embodiment, in response to an occurrence of an event EV, the overlay load manager 214_2 may load the code blocks CB of the firmware program into the working memory 215_WM in a predetermined order. Before loading the code blocks CB to be executed into the working memory 215_WM, the overlay load manager 214_2 may check whether the code blocks CB have been prefetched, and whether the code blocks CB have been cached.

The prefetching memory 215_PM is a memory where the prefetched code blocks CB_PF have been prefetched by the overlay load manager 2142. When the prefetched code blocks CB_PF are executed in a predetermined order in an overlay manner, the overlay load manager 2142 may check whether the prefetched code blocks CB_PF have been prefetched, and copies of the prefetched code blocks CB_PF may be loaded into the working memory 215_WM and be executed.

The caching memory 215_CM is a memory where the code blocks CB provided from the non-volatile memory device 220 and loaded in the working memory 215_WM are temporarily stored. The overlay load manager 214_2 may determine whether to activate a caching operation on the code blocks CB, depending on the event EV, and when the caching operation on the code blocks CB is activated, loaded and executed code blocks CB may be temporarily stored as cached code blocks CB_Ca in the caching memory 215_CM.

Thereafter, when the cached code blocks CB_Ca are executed in a predetermined order in an overlay manner, the overlay load manager 214_2 may check whether the cached code blocks CB_Ca have been cached, and copies of the cached code blocks CB_Ca may be loaded into the working memory 215_WM and be executed.

The buffer memory 215_BM may temporarily store requests REQ and data DATA_H provided from the host device 100, and/or commands CMD, addresses ADDR, and data DATA to be provided to the non-volatile memory device 220, and/or data DATA read from the non-volatile memory device 220.

The storage controller 210 may include the prefetching memory 215_PM and the caching memory 215_CM, and may store some code blocks in the prefetching memory 215_PM in advance or store executed code blocks in the caching memory 215_CM, in response to an occurrence of an event. Through the above-mentioned arrangement, it is possible to reduce the number of times a read command is provided between the storage controller 210 and the non-volatile memory device 220. In particular, when the storage controller 210 executes the firmware program in a predetermined order in an overlay manner without an OS, it is possible to significantly reduce the number of times a read command is provided.

Figure 7:
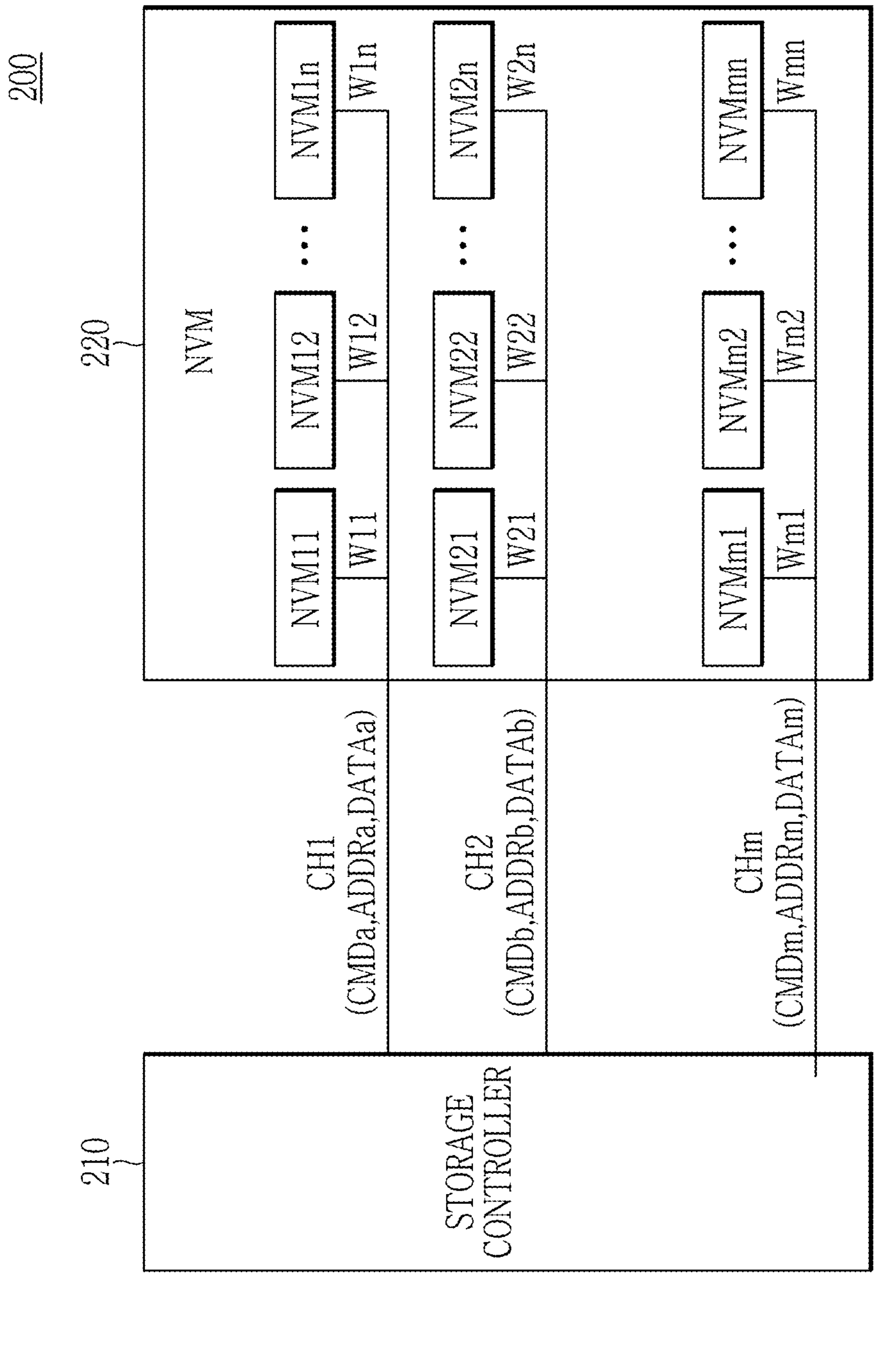
FIG. 7 is a drawing for explaining a storage controller and a non-volatile memory device according to an example embodiment.

FIG. 7 is a drawing for explaining a storage controller and a non-volatile memory device according to an example embodiment. FIG. 7 is a drawing illustrating an example of a configuration of the storage controller 210 and the non-volatile memory device 220 of the storage device 200 of FIG. 1.

Referring to FIG. 1 and FIG. 7, the storage device 200 may include the non-volatile memory device 220 and the storage controller 210. The storage device 200 may support a plurality of channels CH1 to CHm, and the non-volatile memory device 220 and the storage controller 210 may be coupled through the plurality of channels CH1 to CHm. For example, the storage device 200 may be implemented with a storage device such as a solid state drive (SSD).

The non-volatile memory device 220 may include a plurality of non-volatile memory devices NVM11 to NVMmn. Each of the non-volatile memory devices NVM11 to NVMmn may be coupled to one of the plurality of channels CH1 to CHm through a corresponding way among a plurality of ways. For example, the plurality of non-volatile memory devices NVM11 to NVM1*n* may be coupled to the first channel CH1 respectively through ways W11 to W1*n*, and the plurality of non-volatile memory devices NVM21 to NVM2*n* may be coupled to the second channel CH2 respectively through ways W21 to W2*n*. In an embodiment, each of the plurality of non-volatile memory devices NVM11 to NVMmn may be implemented as an arbitrary memory unit capable of operating in response to an individual command from the storage controller 210. For example, each of the plurality of non-volatile memory devices NVM11 to NVMmn may be implemented with a chip or a die, but the disclosure is not limited thereto.

The storage controller 210 may transmit and receive signals to and from the non-volatile memory device 220 through the plurality of channels CH1 to CHm. For example, the storage controller 210 may, through the plurality of channels CH1 to CHm, transmit commands CMDa to CMDm, addresses ADDRa to ADDRm, data DATAa to DATAm to the non-volatile memory device 220 and/or receive data DATAa to DATAm from the non-volatile memory device 220.

The storage controller 210 may select one of the non-volatile memory devices coupled to each channel through a corresponding channel, and transmit and receive signals to and from the selected non-volatile memory device. For example, the storage controller 210 may select the non-volatile memory device NVM11 coupled to the first channel CH1 from the plurality of non-volatile memory devices NVM11 to NVM1*n*. The storage controller 210 may transmit the command CMDa, the address ADDRa, and the data DATAa to the selected non-volatile memory device NVM11 through the first channel CH1 and/or receive data DATAa from the selected non-volatile memory device NVM11.

The storage controller 210 may transmit and receive signals to and from the non-volatile memory device 220 in parallel through different channels. For example, the storage controller 210 may transmit the command CMDb to the non-volatile memory device 220 through the second channel CH2 while transmitting the command CMDa to the non-volatile memory device 220 through the first channel CH1. For example, the storage controller 210 may receive the data DATAb from the non-volatile memory device 220 through the second channel CH2 while receiving the data DATAa from the non-volatile memory device 220 through the first channel CH1.

The storage controller 210 may control the overall operation of the non-volatile memory device 220. The storage controller 210 may control each of the plurality of non-volatile memory devices NVM11 to NVMmn coupled to the plurality of channels CH1 to CHm by transmitting signals to the plurality of channels CH1 to CHm. For example, the storage controller 210 may transmit the command CMDa and the address ADDRa to the first channel CH1, thereby controlling one selected from the plurality of non-volatile memory devices NVM11 to NVM1*n*.

Each of the plurality of non-volatile memory devices NVM11 to NVMmn may operate under the control of the storage controller 210. For example, according to the command CMDa, the address ADDRa, and the data DATAa that are provided to the first channel CH1, the non-volatile memory device NVM11 may program (or write) the data DATAa. For example, according to the command CMDb and the address ADDRb that are provided to the second channel CH2, the non-volatile memory device NVM21 may read the data DATAb and transmit the read data DATAb to the storage controller 210.

FIG. 7 shows an example in which the non-volatile memory device 220 performs communication with the storage controller 210 through the m number of channels and the non-volatile memory device 220 includes the n number of non-volatile memory devices corresponding to the individual channels; however, the number of channels and the number of non-volatile memory devices that are coupled to one channel may be variable changed.

Figure 8:
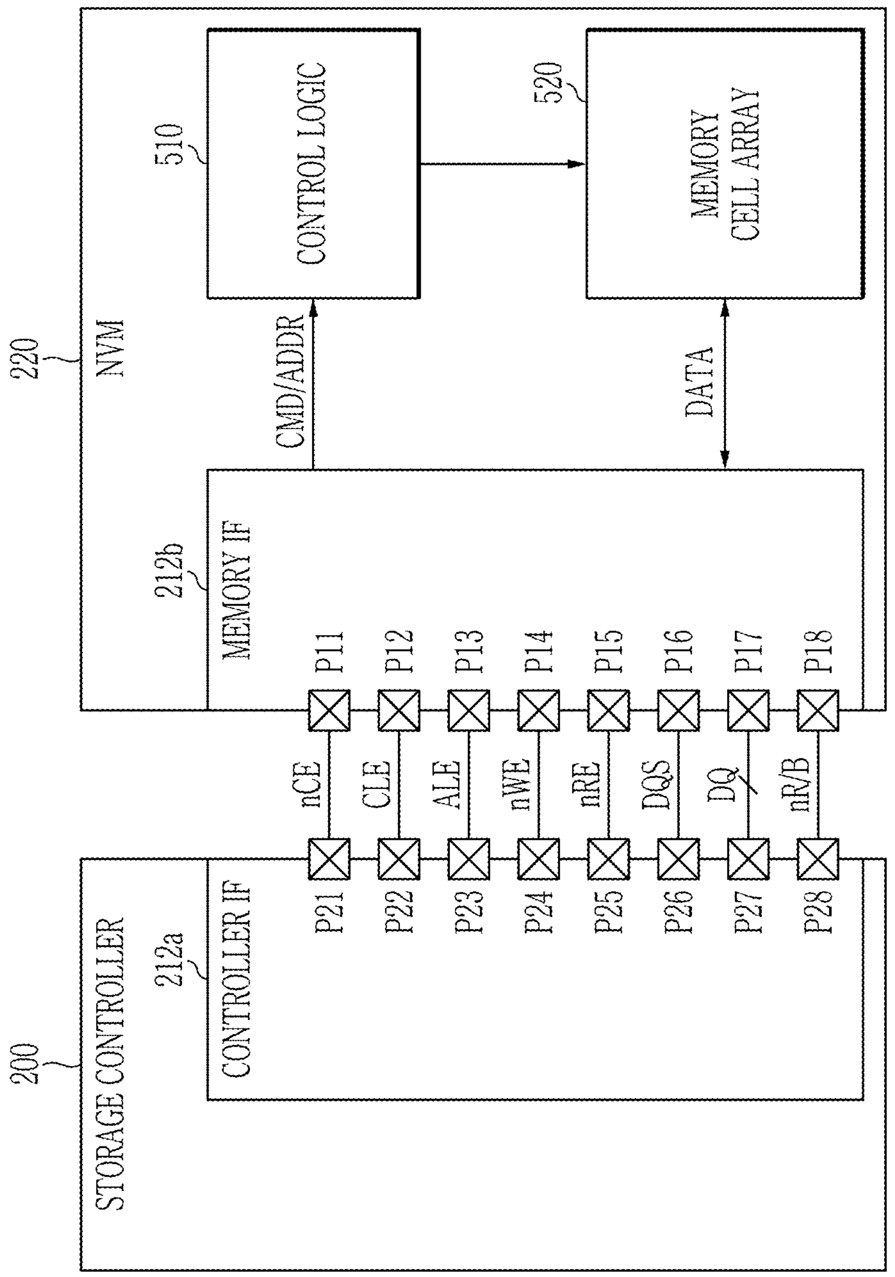
FIG. 8 is a drawing for explaining a storage controller and a non-volatile memory device according to an example embodiment.

FIG. 8 is a drawing for explaining a storage controller and a non-volatile memory device according to an example embodiment. FIG. 8 is a drawing illustrating an example of a configuration of the storage controller 210, the memory interface 212, and the non-volatile memory device 220 of FIG. 1. The memory interface 212 of FIG. 1 may include a controller interface circuit 212*a* of FIG. 8.

FIG. 8 is a drawing illustrating an example of a configuration of the storage controller, the memory interface, and the non-volatile memory device of FIG. 1. The non-volatile memory device 220 may include a memory interface circuit 212*b* and a memory cell array 520 as shown in FIG. 8.

The memory interface circuit 212*b* may receive a chip enable signal nCE from the storage controller 210 through a first pin P11. The memory interface circuit 212*b* may transmit and receive signals to and from the storage controller 210 through second to eighth pins P12 to P18, depending on the chip enable signal nCE. For example, when the chip enable signal nCE is in an enable state (for example, at a low level), the memory interface circuit 212*b* may transmit and receive signals to and from the storage controller 210 through the second to eighth pins P12 to P18.

The memory interface circuit 212*b* may receive a command latch enable signal CLE, an address latch enable signal ALE, and a write enable signal nWE from the storage controller 210 through the second to fourth pins P12 to P14. The memory interface circuit 212*b* may receive a data signal DQ from the storage controller 210 or transmit a data signal DQ to the storage controller 210, through the seventh pin P17. Through data signals DQ, commands CMD, addresses ADDR, and data DATA may be transmitted. For example, data signals DQ may be transmitted through a plurality of data signal lines. In this case, the seventh pin P17 may include a plurality of pins corresponding to a plurality of data signals.

The memory interface circuit 212*b* may obtain commands CMD from data signals DQ that are received in enable sections (e.g., high-level states) of the command latch enable signal CLE based on toggling timings of the write enable signal nWE. The memory interface circuit 212*b* may obtain addresses ADDR from data signals DQ that are received in enable sections (e.g., high-level states) of the address latch enable signal ALE based on the toggling timings of the write enable signal nWE.

In an embodiment, the write enable signal nWE may maintain a static state (for example, at a high level or a low level), and then toggle between the high level and the low level. For example, the write enable signal nWE may toggle in a section in which a command CMD or an address ADDR is transmitted. Accordingly, the memory interface circuit 212*b* may obtain commands CMD or addresses ADDR based on the toggling timings of the write enable signal nWE.

The memory interface circuit 212*b* may receive a read enable signal nRE from the storage controller 210 through the fifth pin P15. The memory interface circuit 212*b* may receive a data strobe signal DQS from the storage controller 210 or transmit a data strobe signal DQS to the storage controller 210 through the sixth pin P16.

During a data (DATA) output operation of the non-volatile memory device 220, the memory interface circuit 212*b* may receive the toggling read enable signal nRE through the fifth pin P15 before outputting data DATA. The memory interface circuit 212*b* may generate the data strobe signal DQS that toggles based on toggling of the read enable signal nRE. For example, the memory interface circuit 212*b* may generate the data strobe signal DQS that starts toggling after a predetermined delay (for example, tDQSRE) from the toggling start time of the read enable signal nRE. The memory interface circuit 212*b* may transmit a data signal DQ containing the data DATA based on the toggling timings of the data strobe signal DQS. Accordingly, the data DATA may be aligned and transmitted to the storage controller 210 at the toggling timings of the data strobe signal DQS.

During a data (DATA) input operation of the non-volatile memory device 220, when the data signal DQ containing data DATA is received from the storage controller 210, the memory interface circuit 212*b* may receive the data strobe signal DQS that toggles along with the data DATA from the storage controller 210. The memory interface circuit 212*b* may obtain the data DATA from the data signal DQ based on the toggling timings of the data strobe signal DQS. For example, the memory interface circuit 212*b* may obtain the data DATA by sampling the data signal DQ at rising edges and falling edges of the data strobe signal DQS.

The memory interface circuit 212*b* may transmit a ready/busy output signal nR/B to the storage controller 210 through the eighth pin P18. The memory interface circuit 212*b* may transmit state information of the non-volatile memory device 220 to the storage controller 210 through the ready/busy output signal nR/B. When the non-volatile memory device 220 is in a busy state (e.g., when internal operations of the non-volatile memory device 220 are being performed), the memory interface circuit 212*b* may transmit a ready/busy output signal nR/B indicating the busy state to the storage controller 210. When the non-volatile memory device 220 is in a ready state (e.g., internal operations of the non-volatile memory device 220 are not being performed or have been completed), the memory interface circuit 212*b* may transmit a ready/busy output signal nR/B indicating the ready state to the storage controller 210.

For example, while the non-volatile memory device 220 reads data DATA from the memory cell array 520 in response to a page read command, the memory interface circuit 212*b* may transmit the ready/busy output signal nR/B indicating the busy state (for example, a low level) to the storage controller 210. For example, while the non-volatile memory device 220 programs data DATA in the memory cell array 520 in response to a program command, the memory interface circuit 212*b* may transmit the ready/busy output signal nR/B indicating the busy state to the storage controller 210.

A control logic circuit 510 may generally control various operations of the non-volatile memory device 220. The control logic circuit 510 may receive the obtained command CMD and the obtained addresses ADDR from the memory interface circuit 212*b*. The control logic circuit 510 may generate control signals for controlling other constituent elements of the non-volatile memory device 220, depending on the received command CMD and the received addresses ADDR. For example, the control logic circuit 510 may program data DATA in the memory cell array 520 or generate various control signals for reading data DATA from the memory cell array 520.

The memory cell array 520 may store the data DATA obtained from the memory interface circuit 212*b* under the control of the control logic circuit 510. The memory cell array 520 may output the data DATA stored therein under the control of the control logic circuit 510, to the memory interface circuit 212*b*.

The memory cell array 520 may include a plurality of memory cells. For example, the plurality of memory cells may be flash memory cells. However, the disclosure is not limited thereto, and the memory cells may be, for example, resistive random access memory (RRAM) cells, ferroelectric random access memory (FRAM) cells, phase change random access memory (PRAM) cells, thyristor random access memory (TRAM) cells, or magnetic random access memory (MRAM) cells. Hereinafter, for illustrative purposes, embodiments of the disclosure will be described with an example embodiment in which the memory cells are NAND flash memory cells.

The storage controller 210 may include first to eighth pins P21 to P28 and the controller interface circuit 212*a*. The first to eighth pins P21 to P28 may respectively correspond to the first to eighth pins P11 to P18 of the non-volatile memory device 220.

The controller interface circuit 212*a* may transmit the chip enable signal nCE to the non-volatile memory device 220 through the first pin P21. The controller interface circuit 212*a* may transmit and receive signals to and from the non-volatile memory device 220 selected through the chip enable signal nCE, through the second to eighth pins P22 to P28.

The controller interface circuit 212*a* may transmit the command latch enable signal CLE, the address latch enable signal ALE, and the write enable signal nWE to the non-volatile memory device 220 through the second to fourth pins P22 to P24, respectively. The controller interface circuit 212*a* may transmit a data signal DQ to the non-volatile memory device 220 or receive a data signal DQ from the non-volatile memory device 220, through the seventh pin P27.

The controller interface circuit 212*a* may transmit a data signal DQ containing a command CMD or addresses ADDR to the non-volatile memory device 220, along with the write enable signal nWE that toggles. The controller interface circuit 212*a* may transmit a data signal DQ containing a command CMD to the non-volatile memory device 220 in response to transmission of the command latch enable signal CLE having an enable state, and transmit a data signal DQ containing addresses ADDR to the non-volatile memory device 220 in response to transmission of the address latch enable signal ALE having an enable state.

The controller interface circuit 212*a* may transmit a read enable signal nRE to the non-volatile memory device 220 through the fifth pin P25. The controller interface circuit 212*a* may receive a data strobe signal DQS from the non-volatile memory device 220 or transmit a data strobe signal DQS to the non-volatile memory device 220, through the sixth pin P26.

During a data (DATA) output operation of the non-volatile memory device 220, the controller interface circuit 212*a* may generate a read enable signal nRE that toggles, and transmit the read enable signal nRE to the non-volatile memory device 220. For example, the controller interface circuit 212*a* may generate a read enable signal nRE that transitions from a static state (for example, a high level or a low level) to a toggling state before data DATA is output. Accordingly, in the non-volatile memory device 220, a data strobe signal DQS which toggles based on the read enable signal nRE may be generated. The controller interface circuit 212*a* may receive a data signal DQ containing data DATA from the non-volatile memory device 220, along with a data strobe signal DQS that toggles. The controller interface circuit 212*a* may obtain the data DATA from the data signal DQ based on the toggling timings of the data strobe signal DQS.

During a data (DATA) input operation of the non-volatile memory device 220, the controller interface circuit 212*a* may generate a data strobe signal DQS that toggles. For example, the controller interface circuit 212*a* may generate a data strobe signal DQS that transitions from a static state (for example, a high level or a low level) to a toggling state before transmitting data DATA. The controller interface circuit 212*a* may transmit a data signal DQ containing the data DATA to the non-volatile memory device 220 based on the toggling timings of the data strobe signal DQS.

The controller interface circuit 212*a* may receive a ready/busy output signal nR/B from the non-volatile memory device 220 through the eighth pin P28. The controller interface circuit 212*a* may determine the state information of the non-volatile memory device 220 based on the ready/busy output signal nR/B.

Figure 9:
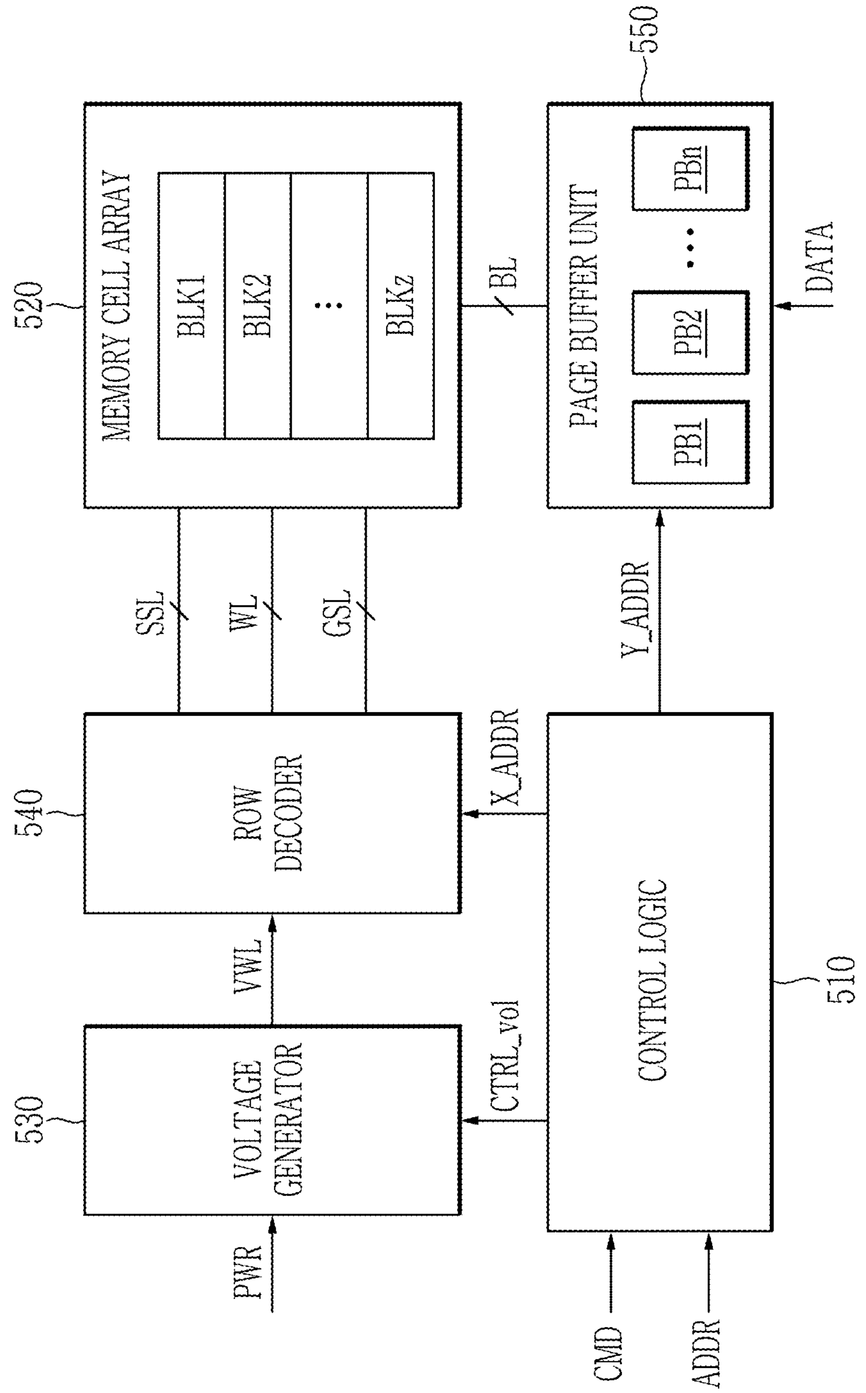
FIG. 9 is a block diagram illustrating a non-volatile memory device according to an example embodiment.

FIG. 9 is a block diagram illustrating a non-volatile memory device according to an example embodiment.

Referring to FIG. 9, the non-volatile memory device 220 may include the control logic circuit 510, the memory cell array 520, a page buffer unit 550, a voltage generator 530, and a row decoder 540. Although not shown in FIG. 9, the non-volatile memory device 220 may further include the memory interface circuit 212*b* shown in FIG. 8, and also may further include a column logic, a pre-decoder, a temperature sensor, a command decoder, an address decoder, and the like.

The control logic circuit 510 may generally control various operations in the non-volatile memory device 220. The control logic circuit 510 may output various control signals in response to a command CMD and/or addresses ADDR from the memory interface circuit (e.g., the reference symbol "212*b*" in FIG. 8). For example, the control logic circuit 510 may output a voltage control signal CTRL_vol, a row address X-ADDR, and a column address Y-ADDR.

The memory cell array 520 may include a plurality of memory blocks BLK1 to BLKz, and each of the plurality of memory blocks BLK1 to BLKz may include a plurality of memory cells. The memory cell array 520 may be coupled to the page buffer unit 550 through bit lines BL, and may be coupled to the row decoder 540 through word lines WL, string selection lines SSL, and ground selection lines GSL.

In an embodiment, the memory cell array 520 may include a three-dimensional memory cell array, and the three-dimensional memory cell array may include a plurality of NAND strings. Each NAND string may include memory cells that are coupled to word lines vertically stacked on a substrate. In an embodiment, the memory cell array 520 may include a two-dimensional memory cell array, and the two-dimensional memory cell array may include a plurality of NAND strings that are arranged along the row and column directions.

The page buffer unit 550 may include a plurality of page buffers PB1 to PBn (wherein n is an integer equal to or greater than 3), and the plurality of page buffers PB1 to PBn may be coupled to the memory cells through the plurality of bit lines BL, respectively. The page buffer unit 550 may select at least one of the bit lines BL in response to the column address Y-ADDR. The page buffer unit 550 may serve as a write driver or a sense amplifier depending on operation modes. For example, during a programming operation, the page buffer unit 550 may apply a bit line voltage corresponding to data to be programmed to the selected bit lines. During a read operation, the page buffer unit 550 may sense the current or voltage of each selected bit line, thereby sensing data stored in the memory cells.

The voltage generator 530 may generate various types of voltages for performing program operations, read operations, and erase operations based on the voltage control signal CTRL_vol. For example, the voltage generator 530 may generate a programming voltage, a read voltage, a programming verifying voltage, an erase voltage, or the like, as a word line voltage VWL.

In response to the row address X-ADDR, the row decoder 540 may select one from the plurality of word lines WL and may select one from the plurality of string selection lines SSL. For example, the row decoder 540 may apply the programming voltage and the programming verifying voltage to the selected word line during a programming operation, and apply the read voltage to the selected word line during a read operation.

Figure 10:
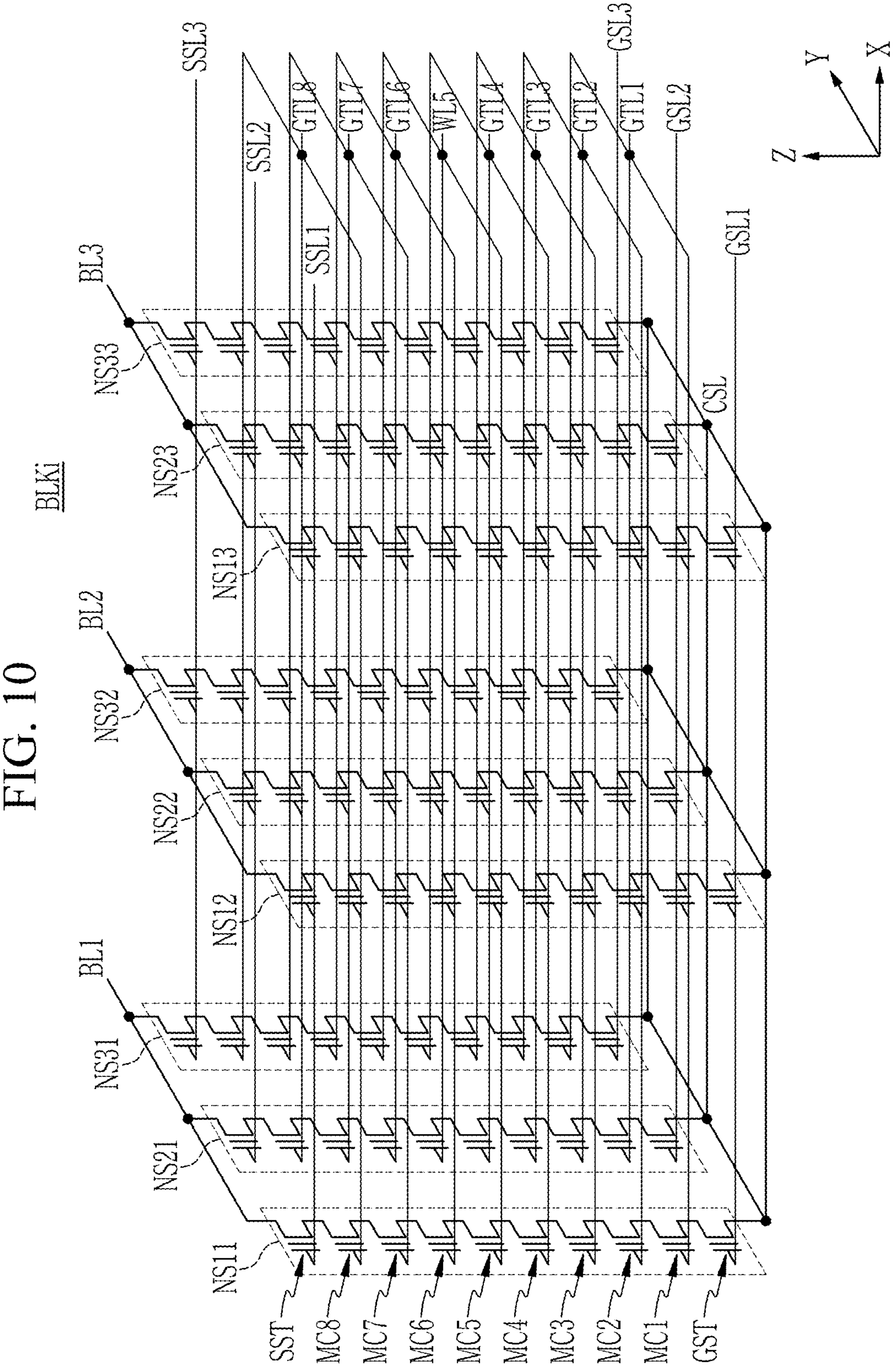
FIG. 10 is a drawing for explaining a three-dimensional structure of a memory cell array according to an example embodiment.

FIG. 10 is a drawing for explaining a three-dimensional structure of a memory cell array according to an example embodiment. When the non-volatile memory device 220 according to an embodiment is implemented with a 3D V-NAND type flash memory, each of a plurality of memory blocks constituting a storage module may be expressed as an equivalent circuit as shown in FIG. 10.

A memory block BLKi shown in FIG. 10 refers to a three-dimensional memory block that is formed on a substrate in a three-dimensional structure. For example, a plurality of memory NAND strings that are included in the memory block BLKi may be formed in a direction perpendicular to the substrate.

Referring to FIG. 10, the memory block BLKi may include a plurality of memory NAND strings NS11 to NS33 that are coupled between bit lines BL1, BL2, and BL3 and a common source line CSL. Each of the plurality of memory NAND strings NS11 to NS33 may include a string selection transistor SST, a plurality of memory cells MC1, MC2, . . . , and MC8, and a ground selection transistor GST. FIG. 10 shows that each of the plurality of memory NAND strings NS11 to NS33 includes eight memory cells MC1, MC2, . . . , and MC8; however, the disclosure is not necessarily limited thereto.

The string selection transistor SST may be coupled to a corresponding one of string selection lines SS1, SSL2, and SSL3. The plurality of memory cells MC1, MC2, . . . , and MC8 may be coupled to corresponding gate lines GTL1, GTL2, . . . , and GTL8, respectively. The gate lines GTL1, GTL2, . . . , and GTL8 may correspond to word lines, and some of the gate lines GTL1, GTL2, . . . , and GTL8 may correspond to dummy word lines. The ground selection transistor GST may be coupled to a corresponding one of ground selection lines GSL1, GSL2, and GSL3. The string selection transistor SST may be coupled to a corresponding one of the bit lines BL1, BL2, and BL3, and the ground selection transistor GST may be coupled to the common source line CSL.

Word lines (for example, WL1) at the same height may be coupled in common, and the ground selection lines GSL1, GSL2, and GSL3 and the string selection lines SS1, SSL2, and SSL3 may be separated from one another. FIG. 10 shows that the memory block BLK is coupled to eight gate lines GTL1, GTL2, . . . , and GTL8 and three bit lines BL1, BL2, and BL3; however, the disclosure is not necessarily limited thereto.

Figure 11:
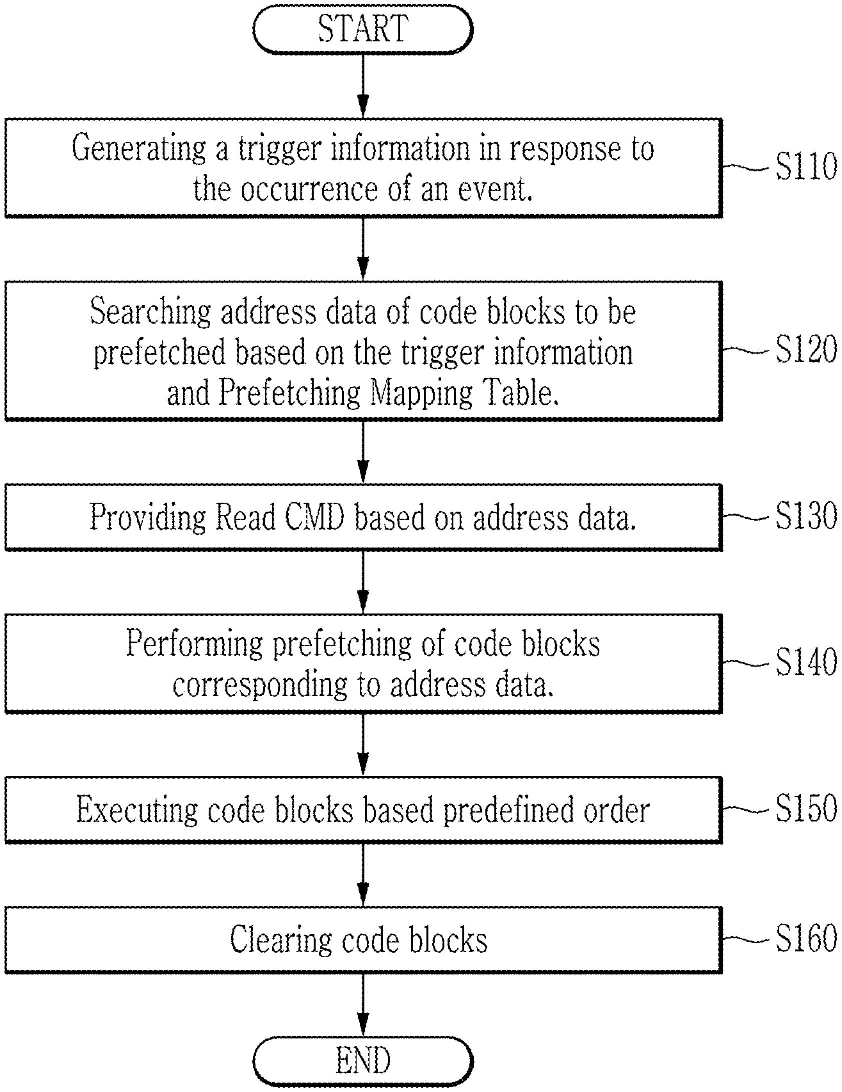
FIG. 11 is a drawing for explaining an operating method of a storage system according to an example embodiment.
Figure 12:
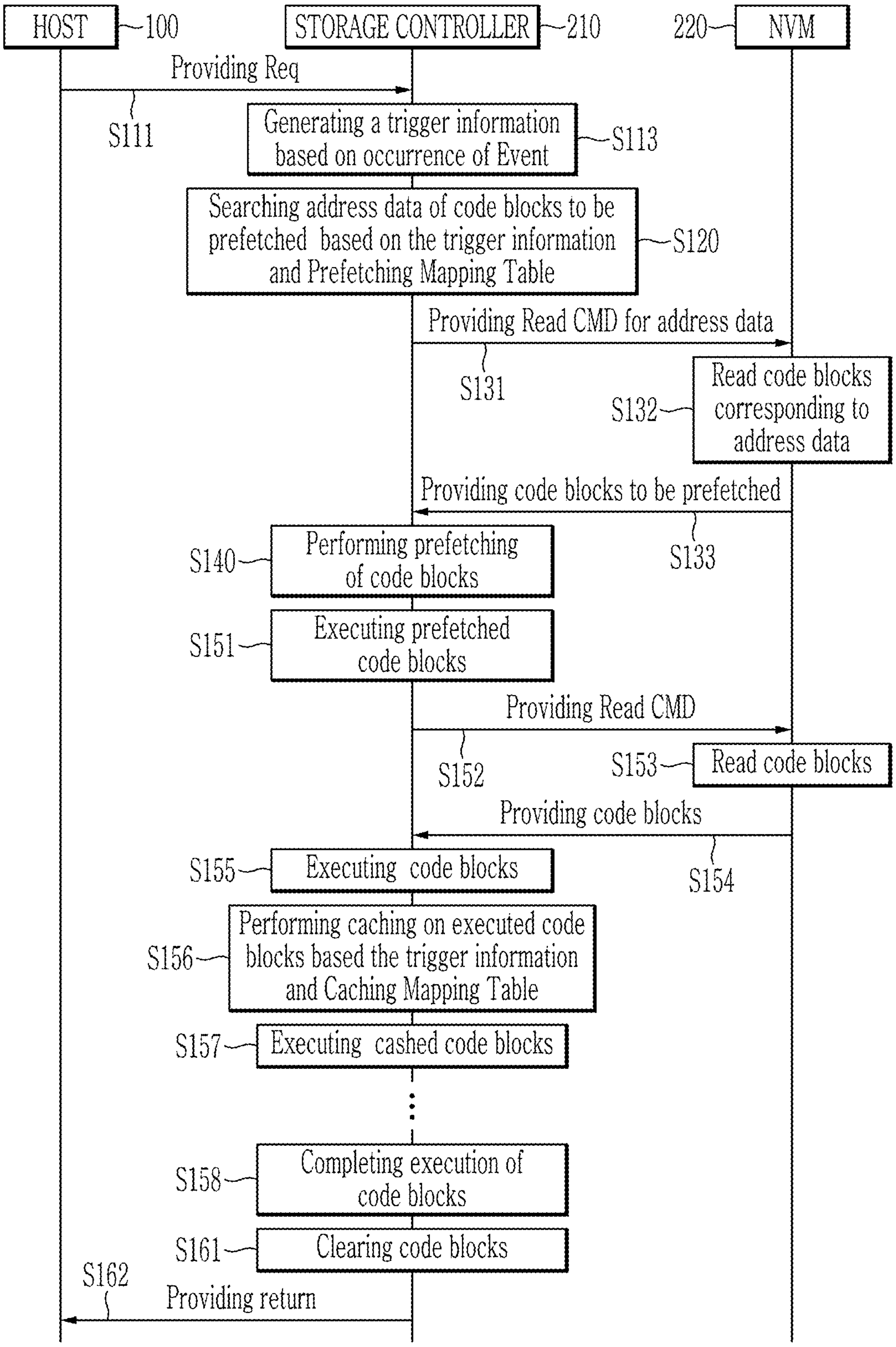
FIG. 12 is a ladder diagram for explaining an operating method of a storage system according to an example embodiment.
Figure 13:
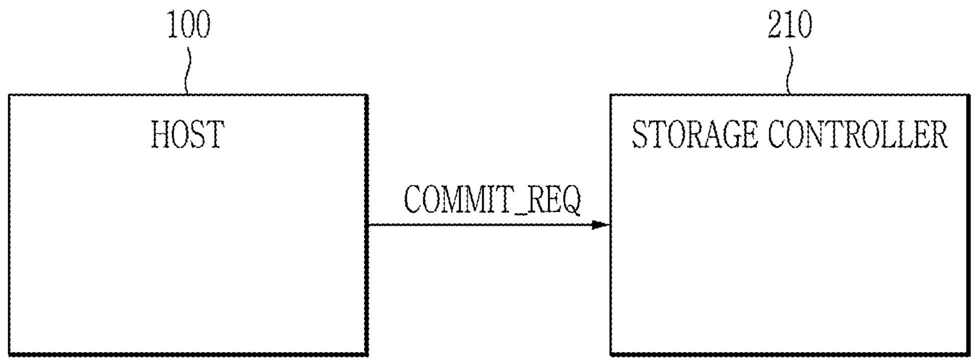
FIG. 13 and FIG. 14 are drawings for explaining an operating method of a storage system according to an example embodiment.
Figure 14:
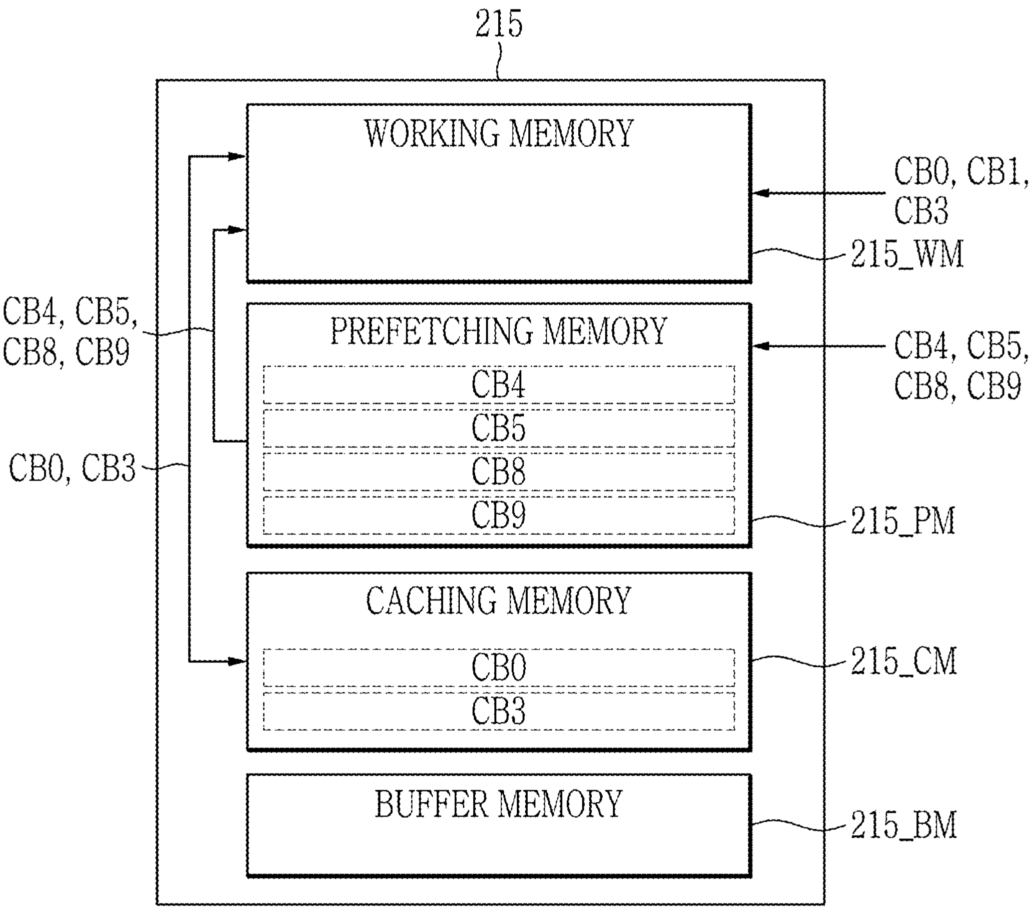

FIG. 11 is a drawing for explaining an operating method of a storage system according to an example embodiment. FIG. 12 is a ladder diagram for explaining an operating method of a storage system according to an example embodiment. FIG. 13 and FIG. 14 are drawings for explaining an operating method of a storage system according to an example embodiment.

FIG. 12 to FIG. 14 are drawings for explaining how a storage system according to an example embodiment operates in response to an event that is caused by a request that is provided from the outside.

Referring to FIG. 1 to FIG. 6, and FIG. 11, the storage controller 210 generates trigger information TR_INFO in response to the occurrence of an event (S110).

With additional reference to FIG. 12 and FIG. 13, the host device 100 may provide a request REQ to the storage controller 210 (S111).

Referring to FIG. 13 as an example, according to an embodiment, the host device 100 may provide a firmware program modification request COMMIT_REQ to the storage controller 210. In response to the reception of the firmware program modification request COMMIT_REQ, the processor 213 may execute code blocks in the order of the fourth code block CB4, the 0-th code block CB0, the third code block CB3, the fifth code block CB5, the first code block CB1, the 0-th code block CB0, the third code block CB3, the eighth code block CB8, the 0-th code block CB0, the third code block CB3, and the ninth code block CB9.

The event trigger module 214_1 may generate trigger information TR_INFO based on an event caused by the reception of the request (S113). The generated trigger information TR_INFO may be provided to the overlay load manager 214_2. Referring to FIG. 4 as an example, the event trigger module 214_1 may provide trigger information TR_INFO corresponding to the index value of 0 to the overlay load manager 214_2 based on the reception of the firmware program modification request COMMIT_REQ.

The storage controller 210 may search for address data of prefetched code blocks CB_PF based on the trigger information TR_INFO and the prefetching mapping table 2143 (S120).

For example, the overlay load manager 2142 may search for the fourth region RG4, the fifth region RG5, the eighth region RG8, and the ninth region RG9 based on the provided trigger information TR_INFO corresponding to the index value of 0 and the prefetching mapping table 214_3.

The storage controller 210 provides a read command RCMD based on the searched address data (S130).

The overlay load manager 214_2 may provide a read command RCMD and addresses ADDR based on the searched address data (S131). For example, the overlay load manager 214_2 may provide a read command RCMD and addresses ADDR related to the fourth region RG4, the fifth region RG5, the eighth region RG8, and the ninth region RG9 to the non-volatile memory device 220 based on the provided trigger information TR_INFO corresponding to the index value of 0.

The non-volatile memory device 220 may perform a read operation based on the provided read command RCMD and addresses ADDR (S132). The non-volatile memory device 220 may read the fourth code block CB4, the fifth code block CB5, the eighth code block CB8, and the ninth code block CB9 stored in the fourth region RG4, the fifth region RG5, the eighth region RG8, and the ninth region RG9 based on the provided read command RCMD.

The non-volatile memory device 220 may provide the read code blocks to the storage controller 210 (S133). The non-volatile memory device 220 may provide the fourth code block CB4, the fifth code block CB5, the eighth code block CB8, and the ninth code block CB9 read, to the storage controller 210.

The storage controller 210 may perform a prefetching operation on the prefetching memory 215_PM based on the code blocks provided from the non-volatile memory device 220 (S140).

With additional reference to FIG. 14, the overlay load manager 214_2 may store the fourth code block CB4, the fifth code block CB5, the eighth code block CB8, and the ninth code block CB9 provided from the non-volatile memory device 220, as prefetched code blocks CB_PF, in the prefetching memory 215_PM.

The storage controller 210 may execute the code blocks in a predetermined order (S150).

Referring to FIG. 13 and FIG. 14 as an example, the storage controller 210 may execute the prefetched code blocks CB_PF (S151). In order for the processor 213 to execute the fourth code block CB4, the overlay load manager 214_2 may check whether the fourth code block CB4 has been prefetched and whether the fourth code block has been cached, and load a copy of the fourth code block CB4 into the working memory 215_WM.

The storage controller 210 may check whether a code block to be executed has been prefetched and whether the code block has been cached, and when the code block to be executed has not been prefetched and cached, the storage controller 210 may provide a read command for the code block to be executed to the non-volatile memory device 220 (S152). In order for the processor 213 to execute the 0-th code block CB0 which is the next execution order, the overlay load manager 214_2 may determine that the 0-th code block CB0 has not been prefetched and cached. The overlay load manager 214_2 may provide a read command for the 0-th code block CB0 to the non-volatile memory device 220.

The non-volatile memory device 220 may perform a read operation based on the provided read command RCMD (S153). The non-volatile memory device 220 may read the 0-th code block CB0 in response to the provided read command RCMD.

The non-volatile memory device 220 may provide the read code block to the storage controller 210 (S154). The non-volatile memory device 220 may provide the read 0-th code block CB0 to the storage controller 210.

The storage controller 210 may execute the provided code block (S155). In order for the processor 213 to execute the 0-th code block CB0 provided from the non-volatile memory device 220, the overlay load manager 214_2 may load the provided 0-th code block CB0 into the working memory 215_WM. In some embodiments, the overlay load manager 214_2 may overwrite the access location of the fourth code block CB4 in the working memory 215_WM with the 0-th code block CB0.

The storage controller 210 may perform caching on the executed code blocks based on the trigger information TR_INFO and the caching mapping table 214_4 (S156). With respect to the 0-th code block CB0 executed without being prefetched, the overlay load manager 214_2 may activate a caching operation based on the trigger information TR_INFO corresponding to the index value of 0 and the 0-th caching mapping information MCa0. The overlay load manager 214_2 may store the executed 0-th code block CB0 in the caching memory 215_CM.

Thereafter, the overlay load manager 214_2 may cache the third code block CB3 after executing the third code block CB3. However, in some embodiments, even if a caching operation is activated according to caching mapping information related to an event, caching may be performed only on some code blocks according to an execution order of code blocks or the policies of the storage controller 210. Referring to FIG. 14 as an example, the 0-th code block CB0 and the third code block CB3 executed first may be cached, but the fourth code block CB4 may not be cached.

The storage controller 210 may execute the cached code block CB_Ca (S157). After the caching operation on the 0-th code block CB0, when the processor 213 is to execute the 0-th code block CB0 again, the overlay load manager 214_2 may check whether the 0-th code block CB0 has been prefetched and whether the 0-th code block CB0 has been cached, and load a copy of the 0-th code block CB0 stored in the caching memory 215_CM into the working memory 215_WM.

The storage controller 210 may complete execution of the code blocks in the predetermined order (S158). In response to the reception of the firmware program modification request COMMIT_REQ, the processor 213 may complete the execution of the code blocks of the firmware program by execution of the ninth code block CB9 according to the order shown in FIG. 13.

FIG. 11 and FIG. 12 show that step S150 of the storage controller 210 may be performed in the order from step S151 to step S157; however, in some embodiments, the order of step S151, step S152 to step S156, and step S157 may be variously changed.

Depending on the order of execution of code blocks by the storage controller 210, the order of step S151 corresponding to execution of prefetched code blocks CB_PF, step S157 corresponding to execution of the cached code blocks CB_Ca, and step S152 to step S156 corresponding to execution of code blocks other than the prefetched code blocks CB_PF and the cached code blocks CB_Ca may be variously changed.

The storage controller 210 may clear the code blocks stored in the prefetching memory 215_PM and the caching memory 215_CM (S160).

The storage controller 210 may clear the code blocks stored in the prefetching memory 215_PM and the caching memory 215_CM, in response to the completion of the execution of the code blocks (S161). The overlay load manager 214_2 may clear the fourth code block CB4, the fifth code block CB5, the eighth code block CB8, and the ninth code block CB9 that are the prefetched code blocks CB_PF stored in the prefetching memory 215_PM and the 0-th code block CB0 and the third code block CB3 that are the cached code blocks CB_Ca stored in the caching memory 215_CM. In some embodiments, during a data write operation, the code blocks that are prefetched and stored in the prefetching memory may be cleared, and a write command for the write operation may be stored in the prefetching memory.

The storage controller 210 may provide a return signal to the host device 100 in response to the completion of the execution of the code blocks of the firmware program (S162). In response to the reception of the firmware program modification request COMMIT_REQ, the storage controller 210 may execute the firmware program corresponding thereto, and may provide a return signal which is the execution result to the host device 100.

FIG. 11 and FIG. 12 show that step S160 of the storage controller may be performed in the order from step S161 to step S162; however, in some embodiments, the order of steps may be changed.

As described above, according to the operations of the event trigger module 214_1, the overlay load manager 214_2, the prefetching mapping table 214_3, and the caching mapping table 214_4, the storage controller 210 may reduce the overhead that may occur in code block execution due to read command provision corresponding to step S152 to step S156.

In general, embedded systems with insufficient memory capacity execute firmware programs in an overlay manner without supporting an OS. In particular, DRAM-less storage controllers with small amounts of memory capacity are likely to execute firmware programs in an overlay manner. When an event occurs in the storage controller, as described above, it is possible to improve the overlay operation performance of the storage controller through the operations of the event trigger module 214_1, the overlay load manager 2142, the prefetching mapping table 214_3, and the caching mapping table 214_4.

Figure 15:
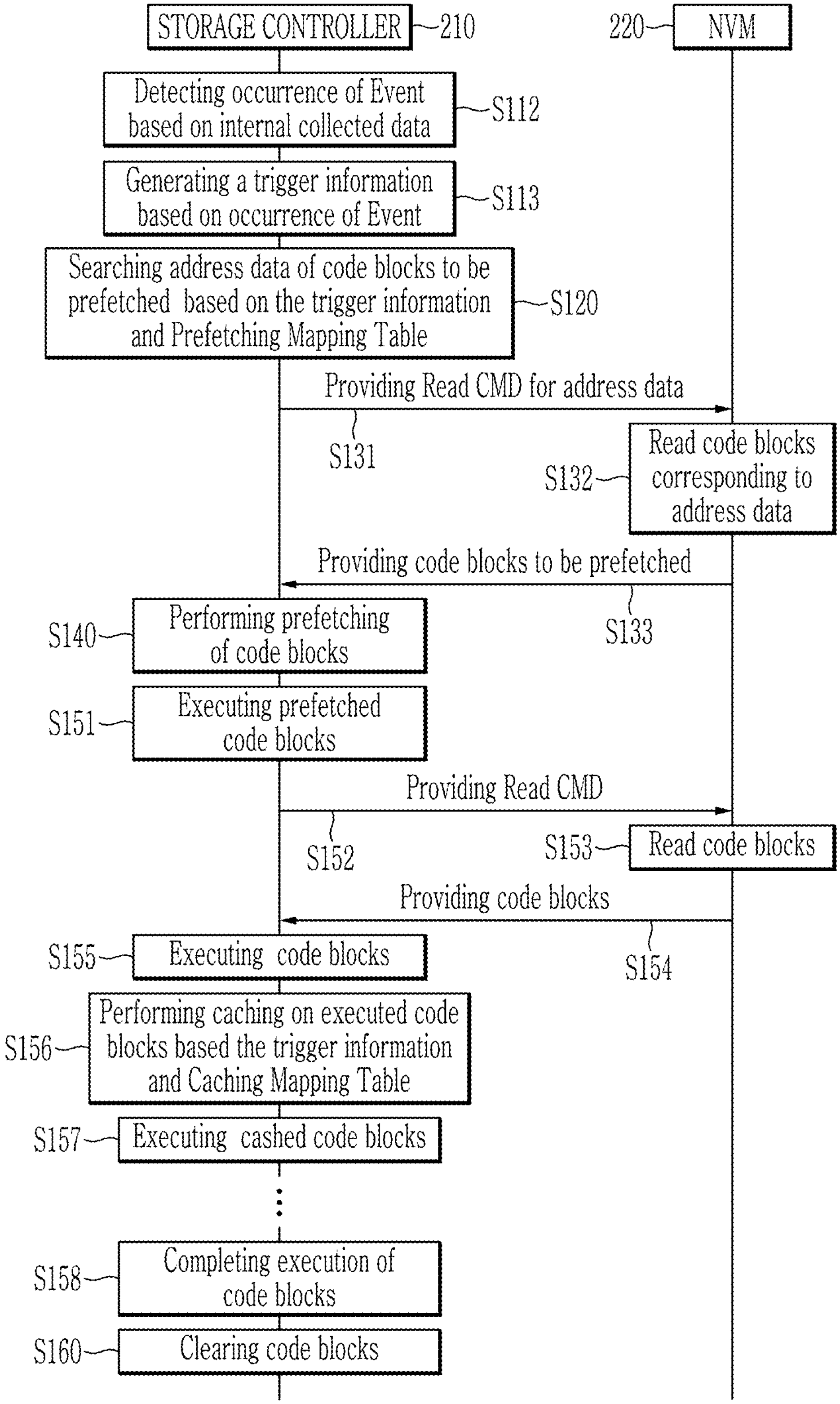
FIG. 15 is a ladder diagram for explaining an operating method of a storage device according to an example embodiment.
Figure 16:
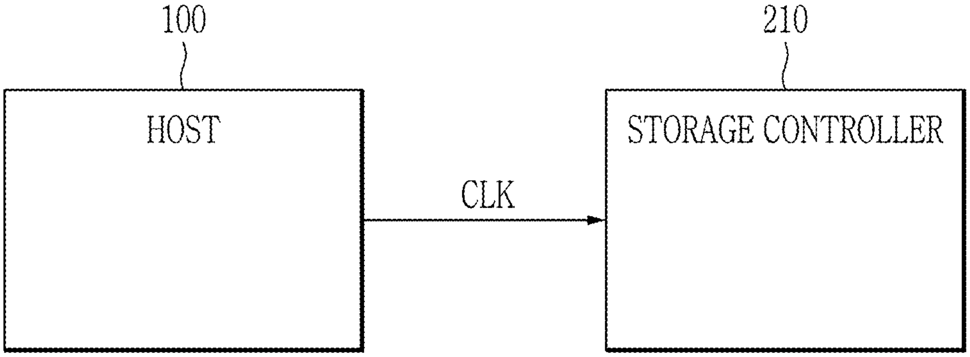
FIG. 16 is a drawing for explaining an operating method of a storage system according to an example embodiment.

FIG. 15 is a ladder diagram for explaining an operating method of a storage device according to an example embodiment. FIG. 16 is a drawing for explaining an operating method of a storage system according to an example embodiment.

FIG. 15 and FIG. 16 are drawings for explaining how the storage device operates in response to an event that occurs based on internal collected data. For ease of explanation, a description of FIG. 15 and FIG. 16 will be made with a focus on the differences from the description of FIG. 12 to FIG. 14. In the following description of FIG. 15 and FIG. 16, a description of the same contents as those of the storage device operation method of FIG. 12 to FIG. 14 will not be repeated.

Referring to FIG. 1 to FIG. 6, FIG. 11, FIG. 15, and FIG. 16, the storage controller 210 generates trigger information TR_INFO in response to the occurrence of an event (S110). According to an embodiment, the storage controller 210 may detect occurrence of an event based on internal collected data ICD (S112).

Referring to FIG. 16 as an example, the storage controller 210 may generate internal collected data ICD by counting the reference clock signal CLK that is provided from the host device 100, and execute a power management mode ENTER_PM based on the internal collected data ICD. According to the execution of the power management mode ENTER_PM, the processor 213 may execute code blocks in the order of the first code block CB1, the second code block CB2, the fourth code block CB4, the third code block CB3, the second code block CB2, the fourth code block CB4, and the fifth code block CB5.

The event trigger module 214_1 may generate trigger information TR_INFO based on an event that occurred according to the internal collected data ICD (S113). The internal collected data ICD may be collected through a context change in the firmware program, the reference clock signal (CLK) count of the processor 213, and the like.

The storage controller 210 may not provide a return signal to the host device 100 even when execution of the code blocks of the firmware program is completed (S158).

Figure 17:
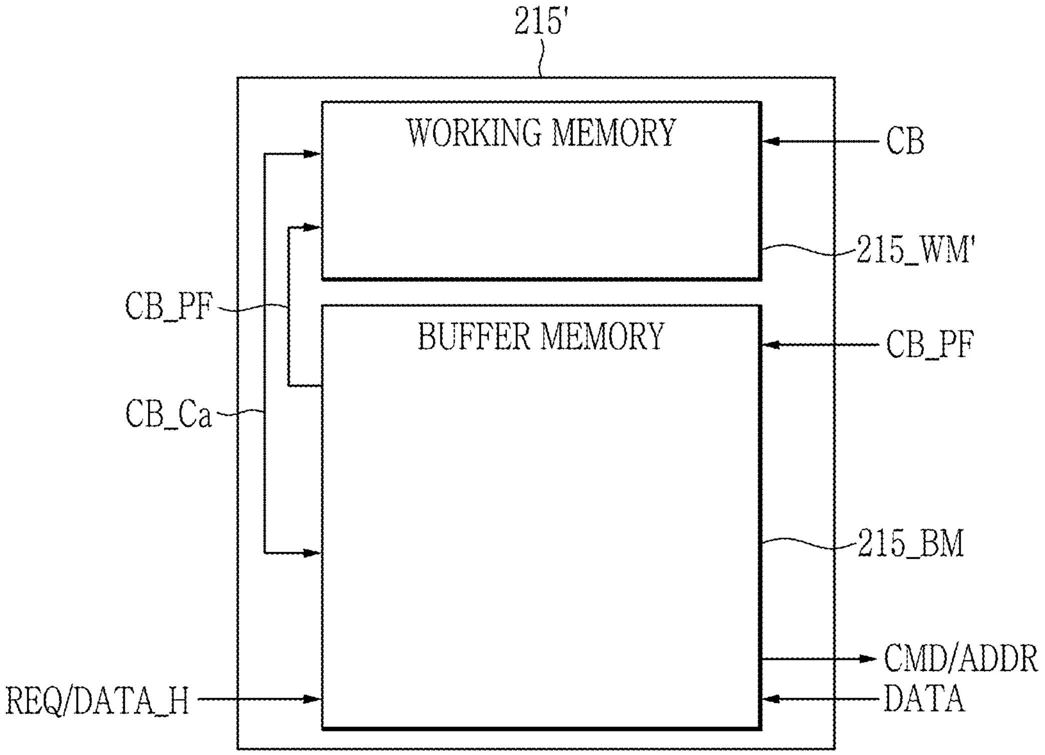
FIG. 17 is a drawing for explaining a memory of a storage controller according to an example embodiment.

FIG. 17 is a drawing for explaining a memory of a storage controller according to an example embodiment. A memory 215' in FIG. 17 and the memory 215 in FIG. 6 may correspond to each other. For ease of explanation, a description of the memory 215' of FIG. 17 will be made with a focus on the differences from the description of the memory 215 of FIG. 6. In the following description of the memory 215' of FIG. 17, a description of the same contents as those of the memory 215 of FIG. 6 will not be repeated.

Referring to FIG. 17, the memory 215' may include a working memory 215_WM and a buffer memory 215_BM'. The working memory 215_WM may correspond to the working memory 215_WM of FIG. 6.

The buffer memory 215_BM' may correspond to the prefetching memory 215_PM, the caching memory 215_CM, and the buffer memory 215_BM of FIG. 6.

The buffer memory 215_BM' may store prefetching code blocks CB_PF and cached code blocks CB_Ca, thereby serving as the prefetching memory 215_PM and the caching memory 215_CM of FIG. 6.

In addition, the buffer memory 215_BM' may temporarily store requests REQ and data DATA_H provided from the host device 100, and/or commands CMD, addresses ADDR, and data DATA to be provided to the non-volatile memory device 220, and/or data DATA read from the non-volatile memory device 220.

However, when the buffer memory 215_BM' stores prefetching code blocks CB_PF and/or cached code blocks CB_Ca, thereby serving as the prefetching memory and/or the caching memory, a clearing operation on requests REQ, data DATA_H from the host device, commands CMD, addresses ADDR, and data DATA may be preceded.

Similarly, when the storage device 200 performs a data input/output operation, the buffer memory 215_BM' may store requests REQ, data DATA_H from the host device, commands CMD, addresses ADDR, and data DATA, thereby serving as a buffer. Before the storage device 200 performs a data input/output operation, prefetched code blocks CB_PF and cached code blocks CB_Ca stored in the buffer memory 215_BM' may be cleared. In some embodiments, during a data write operation, the code blocks that are prefetched and stored in the buffer memory 215_BM' that serves as the prefetching memory may be cleared, and a write command for the write operation may be stored in the buffer memory 215_BM'.

By the above-mentioned configuration, a storage controller with insufficient memory capacity may efficiently perform a data input/output operation and a firmware program execution operation.

Figure 18:
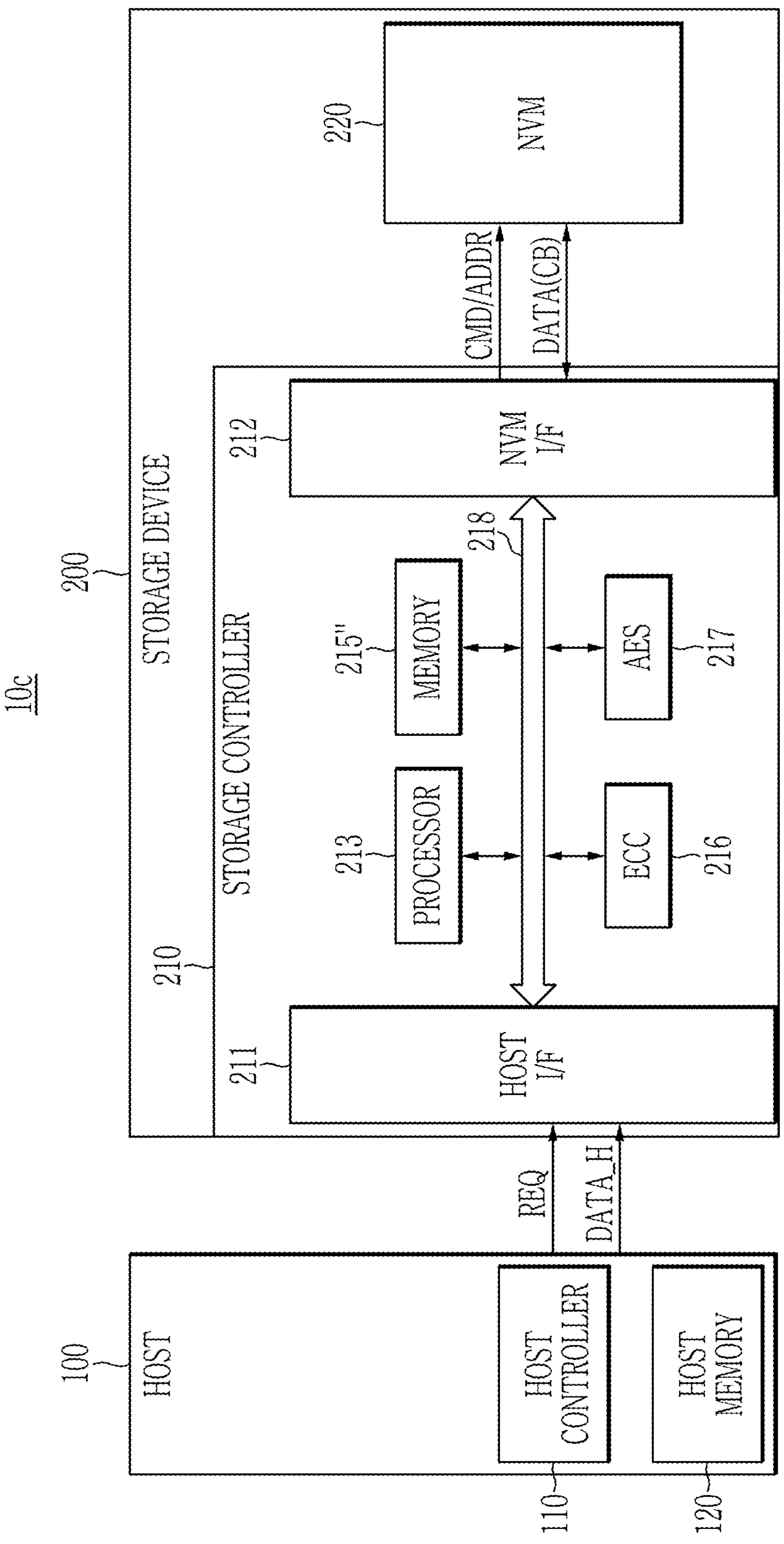
FIG. 18 and FIG. 19 are drawings for explaining a memory of a storage controller according to an example embodiment.
Figure 19:
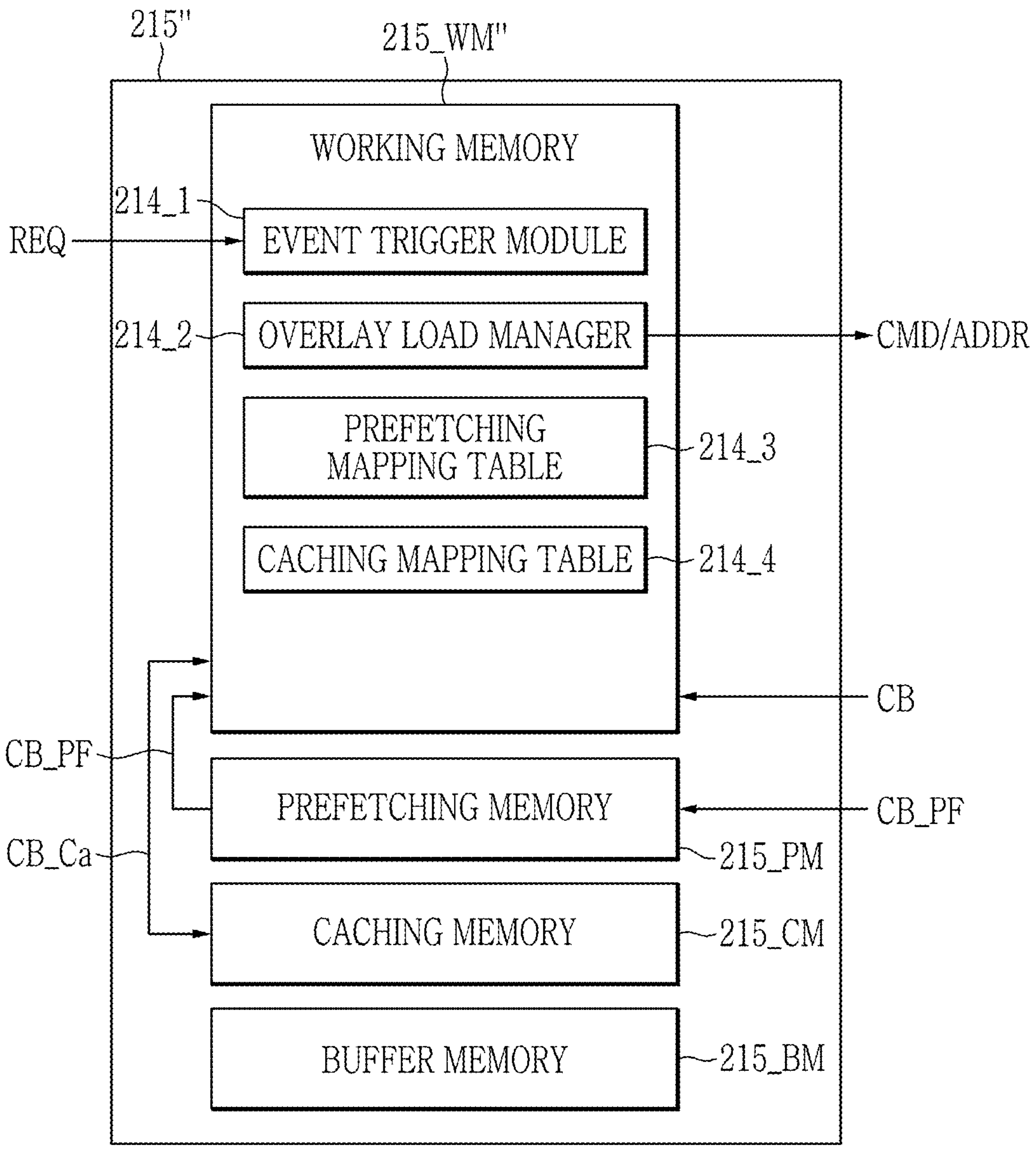

FIG. 18 and FIG. 19 are drawings for explaining a memory of a storage controller according to an example embodiment. A storage system 10*c* of FIG. 18 and the storage system 10*a* of FIG. 1 may correspond to each other, and a memory 215" of FIG. 18 and FIG. 19 may correspond to the TCM 214 and the memory 215 of FIG. 1, FIG. 3, and FIG. 6. For ease of explanation, a description of the memory 215" of FIG. 18 and FIG. 19 will be made with a focus on the differences from FIG. 1, FIG. 3, and FIG. 6. In the following description of the memory 215" of FIG. 18 and FIG. 19, a description of the same contents as those of the TCM 214 and the memory 215 of FIG. 1, FIG. 3, and FIG. 6 will not be repeated.

A storage controller 210" of FIG. 18 may not include any TCM 214 as compared to the storage controller 210 of FIG. 1. The memory 215" may include a working memory 215_WM", a prefetching memory 215_PM, a caching memory 215_CM, and a buffer memory 215_BM.

Into the working memory 215_WM", code blocks CB to be executed may be loaded, and the event trigger module 214_1, the overlay load manager 214_2, the prefetching mapping table 214_3, and the caching mapping table 214_4 may also be loaded into the working memory 215_WM".

The event trigger module 214_1, the overlay load manager 214_2, the prefetching mapping table 214_3, and the caching mapping table 2144 may be firmware programs which may be executed on the working memory 215_WM" by the processor 213.

Figure 20:
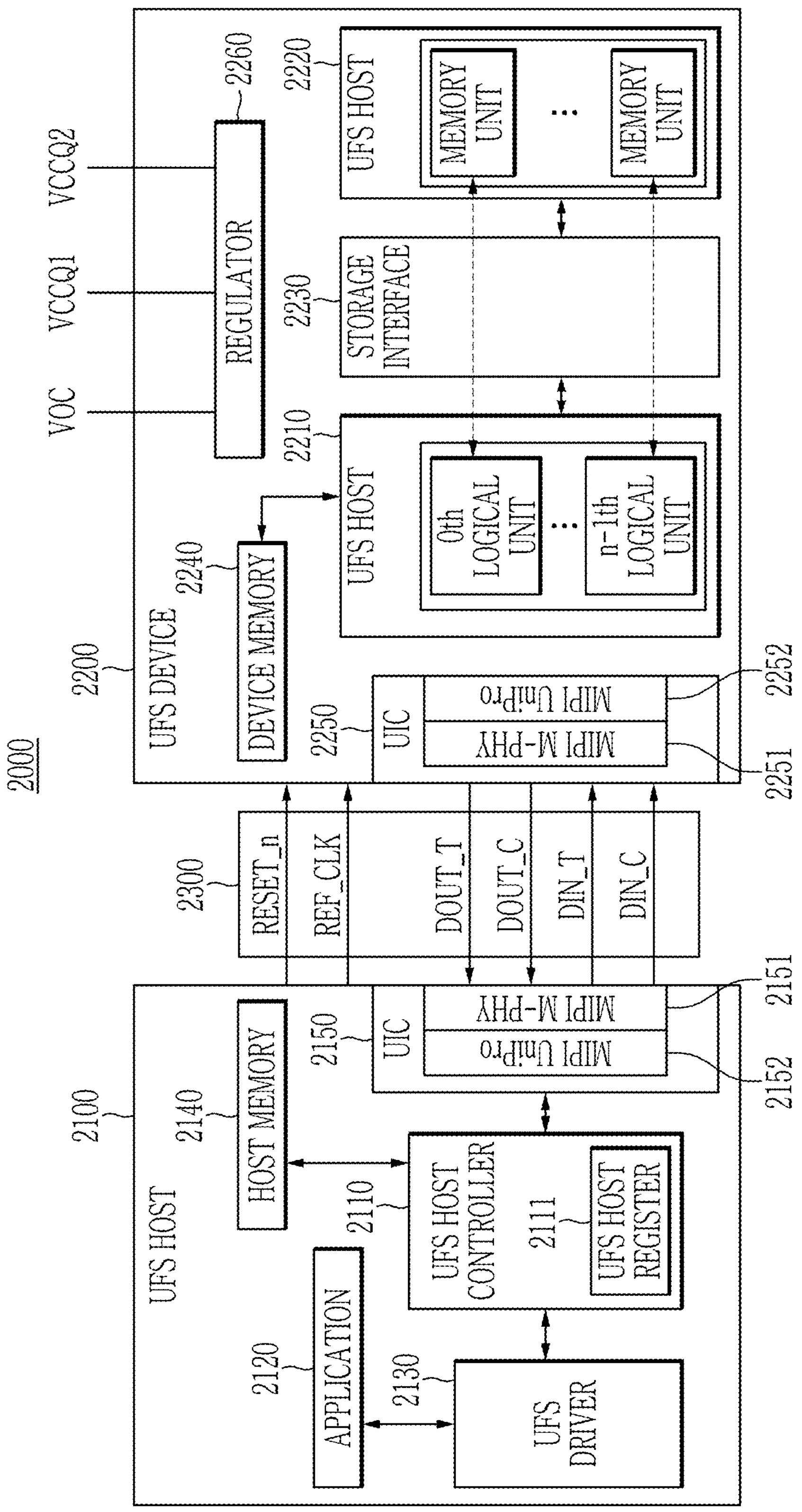
FIG. 20 is a drawing illustrating a universal flash storage (UFS) system including a storage system according to an example embodiment.

FIG. 20 is a drawing illustrating a UFS system including the storage system according to an embodiment. A UFS system 2000 may be a system conforming to a UFS standard published by the joint electron device engineering council (JEDEC), and may include a UFS host 2100, a UFS device 2200, and a UFS interface 2300.

According to an embodiment, the UFS system 2000 may correspond to the storage system 10*a* of FIG. 1 or the storage system 10*c* of FIG. 18. For example, the UFS system 2000 may perform an operation with reference to at least one of FIG. 12 to FIG. 14 or FIG. 15 and FIG. 16.

Referring to FIG. 20, the UFS host 2100 and the UFS device 2200 may be coupled to each other through the UFS interface 2300. The UFS host 2100 may correspond to the host device 100 of FIG. 1 and FIG. 18, and the UFS device 2200 may correspond to the storage device 200 of FIG. 1 and FIG. 18. A UFS device controller 2210 may correspond to the storage controller 210 of FIG. 1 or the storage controller 210" of FIG. 18. A non-volatile memory device 2220 may correspond to the non-volatile memory device 220 of FIG. 1 and FIG. 18. Further, a device memory 2240 may correspond to the TCM 214 and the memory 215 of FIG. 1 or the memory 215" of FIG. 18, and the firmware program execution performance of the UFS device 2200 may be improved through the prefetching and caching operations of FIG. 11 and FIG. 12.

The UFS host 2100 may include a UFS host controller 2110, an application 2120, a UFS driver 2130, a host memory 2140, and a UFS interconnect (UIC layer) 2150. The UFS device 2200 may include the UFS device controller 2210, the non-volatile memory device 2220, a storage interface 2230, the device memory 2240, a UIC layer 2250, and a regulator 2260. The non-volatile memory device 2220 may include a plurality of memory units 2221. According to an embodiment, each of the memory unit 2221 may include a V-NAND flash memory having a 2D structure or a 3D structure. In other embodiments, each of the memory units 2221 may include other types of non-volatile memories such as PRAMs and/or PRAMs. The UFS device controller 2210 and the non-volatile memory device 2220 may be coupled to each other through the storage interface 2230. The storage interface 2230 may be configured to comply with a standard protocol such as Toggle or ONFI.

The application 2120 may refer to a program that aims to perform communication with the UFS device 2200 to use the functions of the UFS device 2200. The application 2120 may transmit input-output requests IOR to the UFS driver 2130 for input/output operations on the UFS device 2200. The input-output requests IOR may refer to data read requests, data write requests, and/or data erase (discard) requests, etc., but are not necessarily limited thereto.

The UFS driver 2130 may manage the UFS host controller 2110 through a UFS host controller interface (UFS-HCI). The UFS driver 2130 may convert an input-output request generated by the application 2120 into a UFS command defined by the UFS standard, and transmit the UFS command to the UFS host controller 2110. One input-output request may be converted into a plurality of UFS commands. UFS commands may be basically commands defined by an SCSI standard, but may be commands dedicated to the UFS standard.

The UFS host controller 2110 may transmit the UFS command obtained by the conversion by UFS driver 2130 to the UIC layer 2250 of the UFS device 2200 through the UIC layer 2150 and the UFS interface 2300. During this process, a UFS host register 2111 of the UFS host controller 2110 may serve as a command queue CQ.

The UIC layer 2150 on the UFS host (2100) side may include an MIPI M-PHY 2151 and an MIPI UniPro 2152, and the UIC layer 2250 on the UFS device (2200) side may also include an MIPI M-PHY 2251 and an MIPI UniPro 2252.

The UFS interface 2300 may include a line configured to transfer a reference clock signal REF_CLK, a line configured to transfer a hardware reset signal RESET_n for the UFS device 2200, a pair of lines configured to transfer a pair of differential input signals DIN_t and DIN_c, and a pair of lines configured to transfer a pair of differential output signals DOUT_t and DOUT_c.

The frequency value of the reference clock signal that is provided from the UFS host 2100 to the UFS device 2200 may be one of four values, e.g., about 19.2 MHz, about 26 MHz, about 38.4 MHz, and about 52 MHz, but is not necessarily limited thereto. Even when the UFS host 2100 is operating, that is, even when data transmission and recognition is being performed between the UFS host 2100 and the UFS device 2200, the frequency value of the reference clock signal REF_CLK may be changed. The UFS device 2200 may generate clock signals having various frequencies from the reference clock signal REF_CLK received from the UFS host 2100, using a phase-locked loop (PLL) and the like. Further, the UFS host 2100 may set a data rate value between the UFS host 2100 and the UFS device 2200, using the frequency value of the reference clock signal REF_CLK. In other words, the data rate may be determined depending on the frequency of the reference clock signal REF_CLK.

The UFS interface 2300 may support multiple lanes, and each lane may include a differential pair. For example, the UFS interface 2300 may include one or more receiving lanes and one or more transmitting lanes. In FIG. 20, the pair of lines that transfer a pair of differential input signals DIN_t and DIN_c and the pair of lines that transfer a pair of differential output signals DOUT_t and DOUT_c may constitute a receiving lane and a transmitting lanes, respectively. FIG. 20 shows one transmitting lane and one receiving lane; however, the numbers of transmitting lanes and receiving lanes may be changed.

The receiving lane and the transmitting lane may transfer data in a serial communication scheme. Due to the structure in which the receiving lane and the transmitting lane are separated, full-duplex communication between the UFS host 2100 and the UFS device 2200 is possible. In other words, even while receiving data from the UFS host 2100 through the receiving lane, the UFS device 2200 may be able to transmit data to the UFS host 2100 through the transmitting lane. Further, control data such as commands from the UFS host 2100 to the UFS device 2200, and user data that the UFS host 2100 needs to write in the non-volatile memory device 2220 of the UFS device 2200 or read from the non-volatile memory device 2220 may be transmitted through the same lanes. Accordingly, between the UFS host 2100 and the UFS device 2200, separate lanes for data transmission do not need to be further provided in addition to the pair of receiving lanes and the pair of transmitting lanes.

The UFS device controller 2210 of the UFS device 2200 may generally control the operation of the UFS device 2200. The UFS device controller 2210 may manage the non-volatile memory device 2220 through logical units (LUs) 2211 which are logical data storage units. The number of LUs 2211 may be 8, but is not limited thereto. The UFS device controller 2210 may include a flash translation layer (FTL), and may translate a logical address such as a logical block address (LBA) transmitted from the UFS host 2100 into a physical address such as a physical block address (PBA), using address mapping information of the FTL. In the UFS system 2000, logical blocks for storing user data may have a size in a predetermined range. For example, the minimum size of the logical blocks may be set to 4 Kbyte.

When a command from the UFS host 2100 is input to the UFS device 2200 through the UIC layer 2250, the UFS device controller 2210 may perform an operation according to the input command, and when the operation is completed, the UFS device controller may transmit a completion response to the UFS host 2100.

According to an embodiment, in order for the UFS host 2100 to store user data in the UFS device 2200, the UFS host 2100 may transmit a data storage command to the UFS device 2200. When receiving a response (a ready-to-transfer response) indicating that the user device is ready to receive the user data from the UFS device 2200, the UFS host 2100 may transmit the user data to the UFS device 2200. The UFS device controller 2210 may temporarily store the received user data in the device memory 2240, and store the user data temporarily stored in the device memory 2240, at a selected position of the non-volatile memory device 2220 based on the address mapping information of the FTL.

According to an embodiment, in order for the UFS host 2100 to read user data stored in the UFS device 2200, the UFS host 2100 may transmit a data read command to the UFS device 2200. When the UFS device controller 2210 receives the command, it may read the user data from the non-volatile memory device 2220 based on the data read command, and temporarily store the read user data in the device memory 2240.

Further, the UFS device controller 2210 may transmit the user data temporarily stored in the device memory 2240 to the UFS host 2100.

The UFS host 2100 may store commands to be transmitted to the UFS device 2200, in the UFS host register 2111 which may serve as a common queue, in order, and transmit the commands to the UFS device 2200 according to that order. In this case, even while a previously transmitted command is still being processed by the UFS device 2200, e.g., even before the UFS host 2100 receives a notification that the previously transmitted command has been processed by the UFS device 2200, the UFS host may transmit the next command which is on standby in the command queue to the UFS device 2200, and accordingly, the UFS device 2200 may also receive the next command from the UFS host 2100 even while processing the previously transmitted command. The maximum number of commands that can be stored in the command queue as described above (the queue depth) may be, for example, 32. Further, the command queue may be implemented in a circular queue type in which the beginning and end of a command line stored in the queue are pointed with a head pointer and a tail pointer.

Each of the plurality of memory units 2221 may include a memory cell array (not shown in the drawing) and a control circuit (not shown in the drawing) for controlling the operation of the memory cell array. The memory cell array (not shown in the drawing) may correspond to the memory cell array 520 of FIG. 9, and the control circuit (not shown in the drawing) may correspond to the control logic circuit 510 of FIG. 9.

To the UFS device 2200, voltages VCC, VCCQ, and VCCQ2, and the like may be input as power voltages. The voltage VCC may be a main power voltage for the UFS device 2200, and may have a value in a range from about 2.4 V to about 3.6 V. The voltage VCCQ may be a power voltage for supplying a voltage in a low range, be mainly for the UFS device controller 2210, and have a value in a range from about 1.14 V to 1.26 V. The voltage VCCQ2 may be a power voltage for supplying a voltage in a range lower than the voltage VCC and higher than the voltage VCCQ, be mainly for input/output interfaces such as the MIPI M-PHY 2251, and have a value in a range from about 1.7 V to about 1.95 V. The power voltages may be supplied through the regulator 2260 for individual constituent elements of the UFS device 2200. The regulator 2260 may be implemented in the form of a set of unit regulators that are coupled to different voltages of the above-mentioned power voltages, respectively.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While this disclosure has been described in connection with what is presently considered to be practical embodiments, it is to be understood that the disclosure is not limited to the disclosed example embodiments. On the contrary, it is intended to cover various modifications and equivalent arrangements included within the spirit and scope of the appended claims and their equivalents.

What is claimed is:

1. A method of operating a storage device, the method comprising:

generating trigger information related to an event, in response to an occurrence of the event among a plurality of events, the event corresponding to a plurality of code blocks to be executed in a predetermined order;

searching, by using the trigger information and a mapping table that includes a plurality of pieces of mapping information in which the plurality of events are respectively mapped with address data of at least one code block in a non-volatile memory device, for first address data of a first code block and second address data of a second code block, based on first mapping information, included in the mapping table, in which the event is mapped with the first address data of the first code block in the non-volatile memory device and the second address data of the second code block in the non-volatile memory device, the first and second code blocks being related to the event;

transmitting a read command to the non-volatile memory device based on the first address data and the second address data;

prefetching the first code block and the second code block received from the non-volatile memory device into a prefetching memory; and loading the prefetched first code block and the prefetched second code block into a working memory based on the predetermined order.

2. The method according to claim 1, wherein the generating the trigger information includes receiving an external request corresponding to the event.

3. The method according to claim 1, further comprising:

transmitting a read command based on third address data of a third code block different from the first and second code blocks.

4. The method according to claim 3, further comprising:

executing caching on the third code block.

5. A storage controller comprising:

a working memory;

a first mapping table that includes a plurality of pieces of mapping information in which a plurality of events are respectively mapped with address data of at least one code block in an external non-volatile memory device, the first mapping table including first mapping information in which an event, among the plurality of events, is mapped with first address data of a first code block in the external non-volatile memory device and second address data of a second code block in the external non-volatile memory device, the event corresponding to a plurality of code blocks to be executed in a predetermined order, and the first and second code blocks being related to the event;

a prefetching memory configured to, in response to an occurrence of the event, provide the first code block and the second code block, prefetched from the external non-volatile memory device based on the first mapping information, to the working memory based on the predetermined order; and a processor configured to execute, in the predetermined order, the plurality of code blocks including the first code block and the second code block that are loaded into the working memory.

6. The storage controller of claim 5, wherein in the working memory, the first code block is overwritten with the second code block, and wherein the processor is further configured to execute the first code block and then the second code block.

7. The storage controller of claim 5, wherein the event is based on a request that is provided from an outside.

8. The storage controller of claim 7, wherein the event is based on a request for modification of a firmware program to be executed in the processor.

9. The storage controller of claim 5, wherein the event is detected based on internal collected data.

10. The storage controller of claim 9, wherein the internal collected data is generated based on a count value of a clock signal, and wherein the event corresponds to an execution of a power management mode by the processor based on the internal collected data.

11. The storage controller of claim 5, further comprising:

an event trigger module configured to output trigger information based on the occurrence of the event; and an overlay load manager configured to search, from the first mapping table, for the first address data of the first code block and the second address data of the second code block, based on the first mapping information using the trigger information.

12. The storage controller of claim 11, wherein the overlay load manager is further configured to output a read command for the first address data and the second address data to the external non-volatile memory device, based on whether the first code block and the second code block have been prefetched.

13. The storage controller of claim 11, further comprising:

a tightly coupled memory (TCM), provided to the processor, wherein the event trigger module, the overlay load manager, and the first mapping table are loaded into the TCM.

14. The storage controller of claim 11, wherein the working memory and the prefetching memory are included in a memory, and wherein the event trigger module, the overlay load manager, and the first mapping table are loaded into the memory.

15. The storage controller of claim 11, wherein during a data write operation, the first and second code blocks in the prefetching memory are cleared, and a write command for the write operation is stored in the prefetching memory.

16. The storage controller of claim 5, wherein the processor is further configured to execute a third code block, the third code block being different from the first code block and the second code block and being related to the event, and wherein the storage controller further includes a second mapping table that includes second mapping information in association with the event, indicating whether a caching operation on the third code block is to be activated.

17. The storage controller of claim 16, further comprising:

a caching memory into which the executed third code block is cached.

18. A storage device comprising:

a non-volatile memory device configured to store a first code block and a second code block; and a storage controller including:

a mapping table that includes a plurality of pieces of mapping information in which a plurality of events are respectively mapped with address data of at least one code block in the non-volatile memory device, the first mapping table including first mapping information in which a first event is mapped with first address data of the first code block in the non-volatile memory device and second address data of the second code block in the non-volatile memory device, the first event corresponding to a plurality of code blocks to be executed in a predetermined order;

a prefetching memory into which the first and second code blocks received from the non-volatile memory device are prefetched; and a working memory into which the prefetched first and second code blocks are loaded in a based on the predetermined order.

19. The storage device of claim 18, wherein the mapping table further includes second mapping information between a second event, different from the first event, and the first address data and third address data, the third address data being different from the first and second address data.

20. The storage device of claim 18, wherein the non-volatile memory device includes a firmware area, in which a firmware to be executed by the storage controller is stored, and a user area, in which data that are input from an outside are stored, and wherein the firmware area includes a first region in which the first code block is stored, and a second region in which the second code block is stored.

* * * * *